(12) United States Patent
Ishida et al.

(10) Patent No.: US 7,061,703 B2
(45) Date of Patent: Jun. 13, 2006

(54) MASTER INFORMATION CARRIER AND METHOD FOR MANUFACTURING MAGNETIC DISC USING THE SAME

(75) Inventors: Tatsuaki Ishida, Shiga (JP); Keizo Miyata, Kadoma (JP); Nobuyuki Komura, Kyoto (JP); Yasuaki Ban, Hirakata (JP); Taizou Hamada, Katano (JP); Hideyuki Hashi, Kadoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 307 days.

(21) Appl. No.: 10/686,145

(22) Filed: Oct. 14, 2003

(65) Prior Publication Data
US 2004/0257687 A1  Dec. 23, 2004

Related U.S. Application Data

(63) Continuation of application No. 09/979,872, filed as application No. PCT/JP01/02697 on Mar. 29, 2001.

(30) Foreign Application Priority Data
Mar. 31, 2000 (JP) .............................. 2000-097307
Apr. 14, 2000 (JP) .............................. 2000-113737

(51) Int. Cl.
*G11B 5/86* (2006.01)
(52) U.S. Cl. ........................................................ 360/17
(58) Field of Classification Search ..................... None
See application file for complete search history.

(56) References Cited

U.S. PATENT DOCUMENTS

| | | | |
|---|---|---|---|
| 3,869,711 A | 3/1975 | Bernard et al. | 360/17 |
| 4,422,106 A | 12/1983 | Sawazaki | 360/17 |
| 6,347,016 B1 | 2/2002 | Ishida et al. | 360/17 |
| 6,433,944 B1 | 8/2002 | Nagao et al. | 360/16 |
| 6,747,822 B1 * | 6/2004 | Saito | 360/17 |

FOREIGN PATENT DOCUMENTS

| | | |
|---|---|---|
| EP | 915 456 | 5/1999 |
| JP | 56-7243 | 1/1981 |
| JP | 10-40544 | 2/1998 |
| JP | 100405544 | 2/1998 |
| JP | 10-320768 | 12/1998 |
| JP | 11-25455 | 1/1999 |
| JP | 11-144218 | 5/1999 |
| JP | 11-273069 | 10/1999 |

* cited by examiner

*Primary Examiner*—Wayne Young
*Assistant Examiner*—Glenda P. Rodriguez
(74) *Attorney, Agent, or Firm*—Hamre, Schumann, Mueller & Larson, P.C.

(57) ABSTRACT

A master information carrier capable of manufacturing a magnetic recording medium in which a preformat recording of information signals causing no reproduction signal detection errors arising from a pulse shift of a reproduction waveform is performed. A master information carrier 1 has an array of ferromagnetic thin films 3 arranged according to the pattern of information signals and is used for forming magnetization 4 of a pattern corresponding to the array pattern of the ferromagnetic thin film 3 in a magnetic recording medium by applying a magnetic field while opposing the master information carrier 1 against a magnetic recording medium 2. Each of the ferromagnetic thin films 3 is formed such that each pattern length A becomes equal to a length including a correction amount α in addition to a length a between magnetic transition areas 6 of the magnetization 4 to be formed in the magnetic recording medium 2.

9 Claims, 27 Drawing Sheets

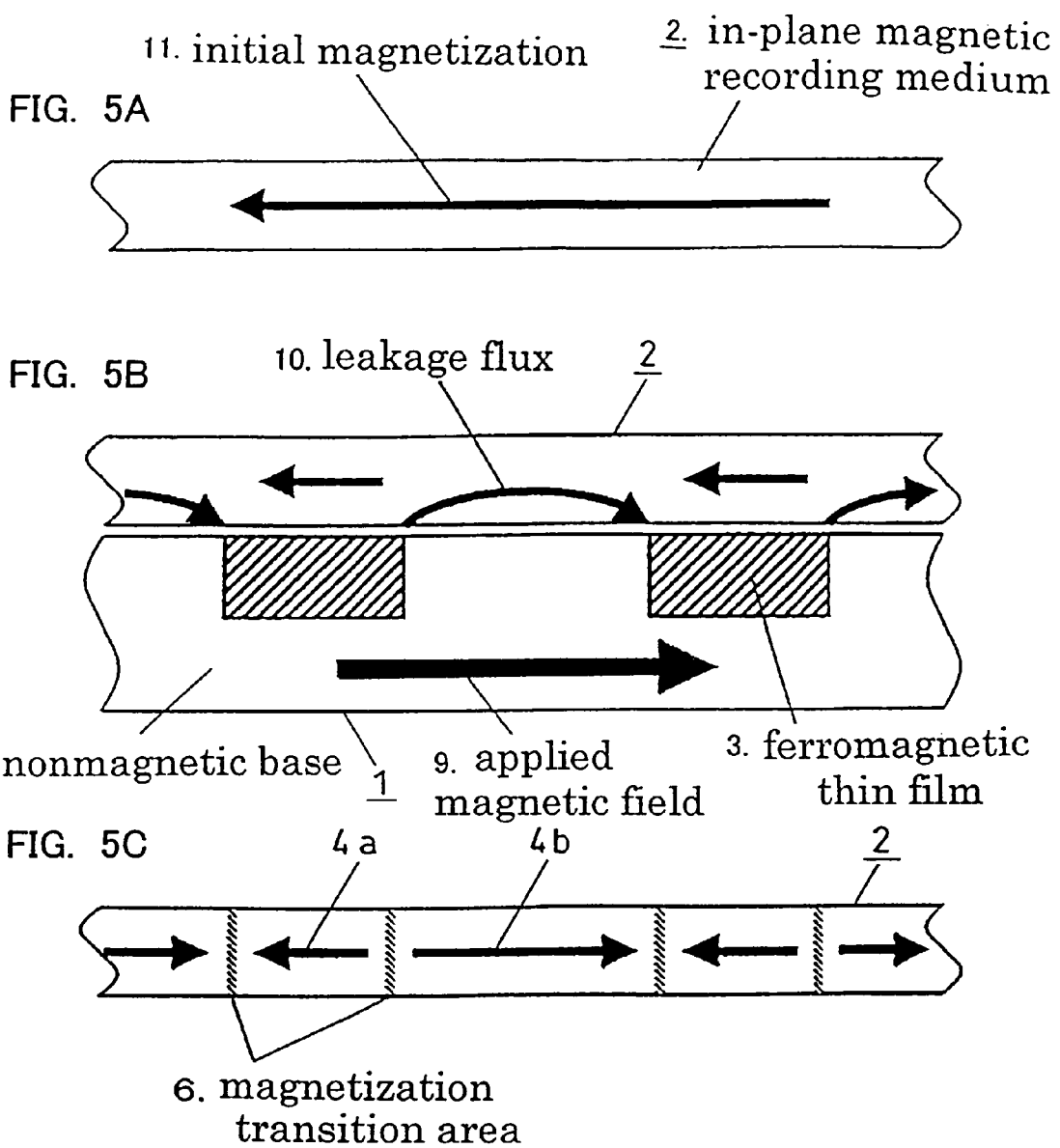

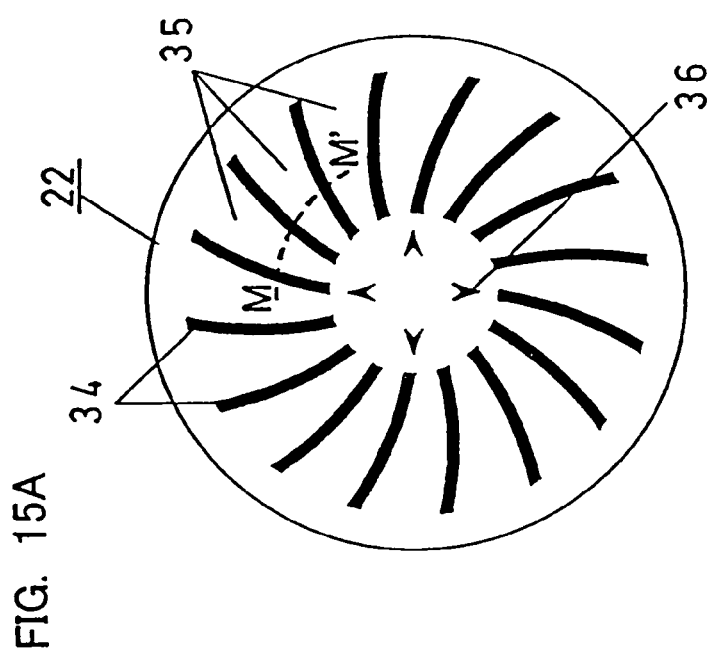
FIG. 15A
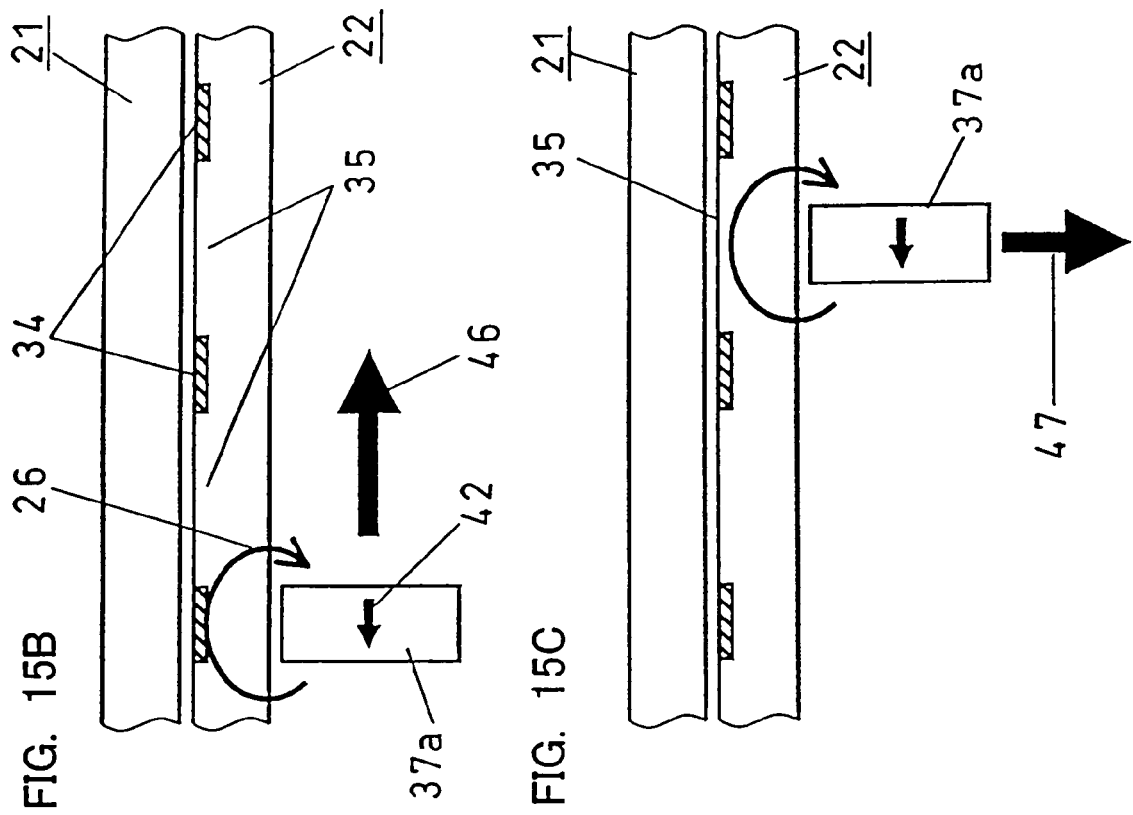
FIG. 15B
FIG. 15C

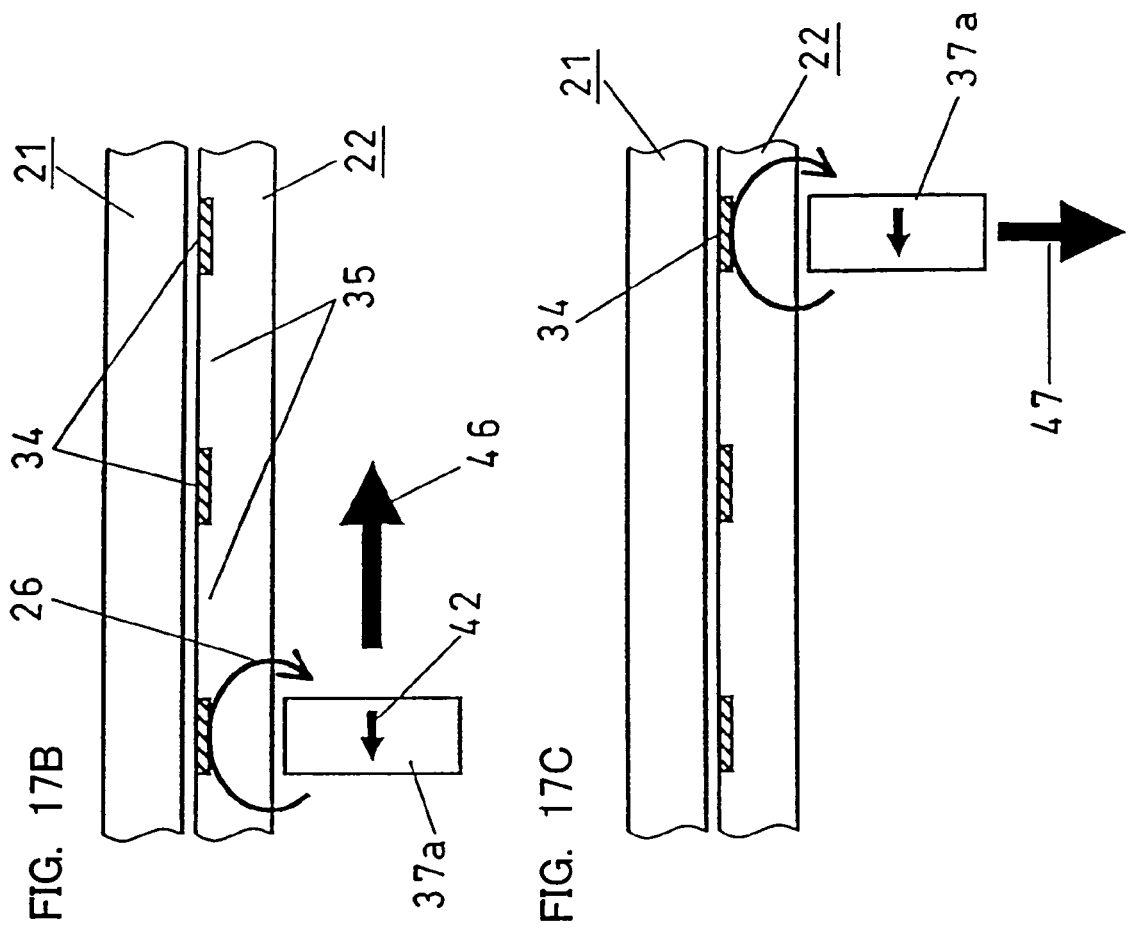
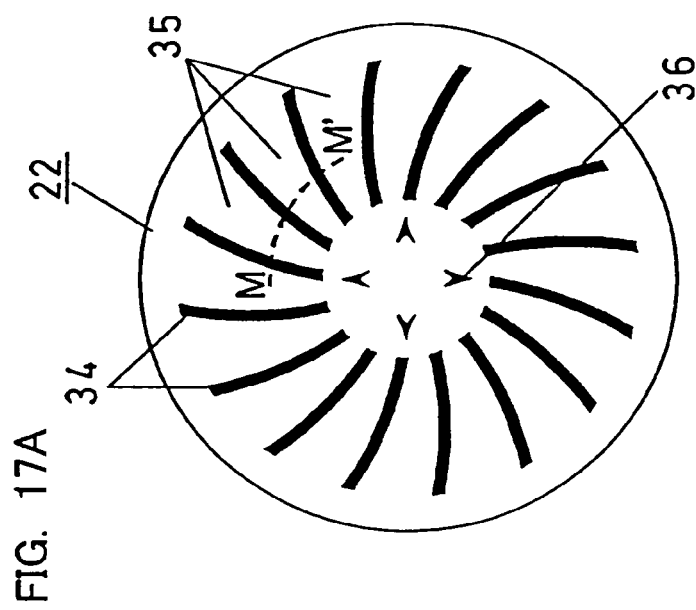

coil current OFF

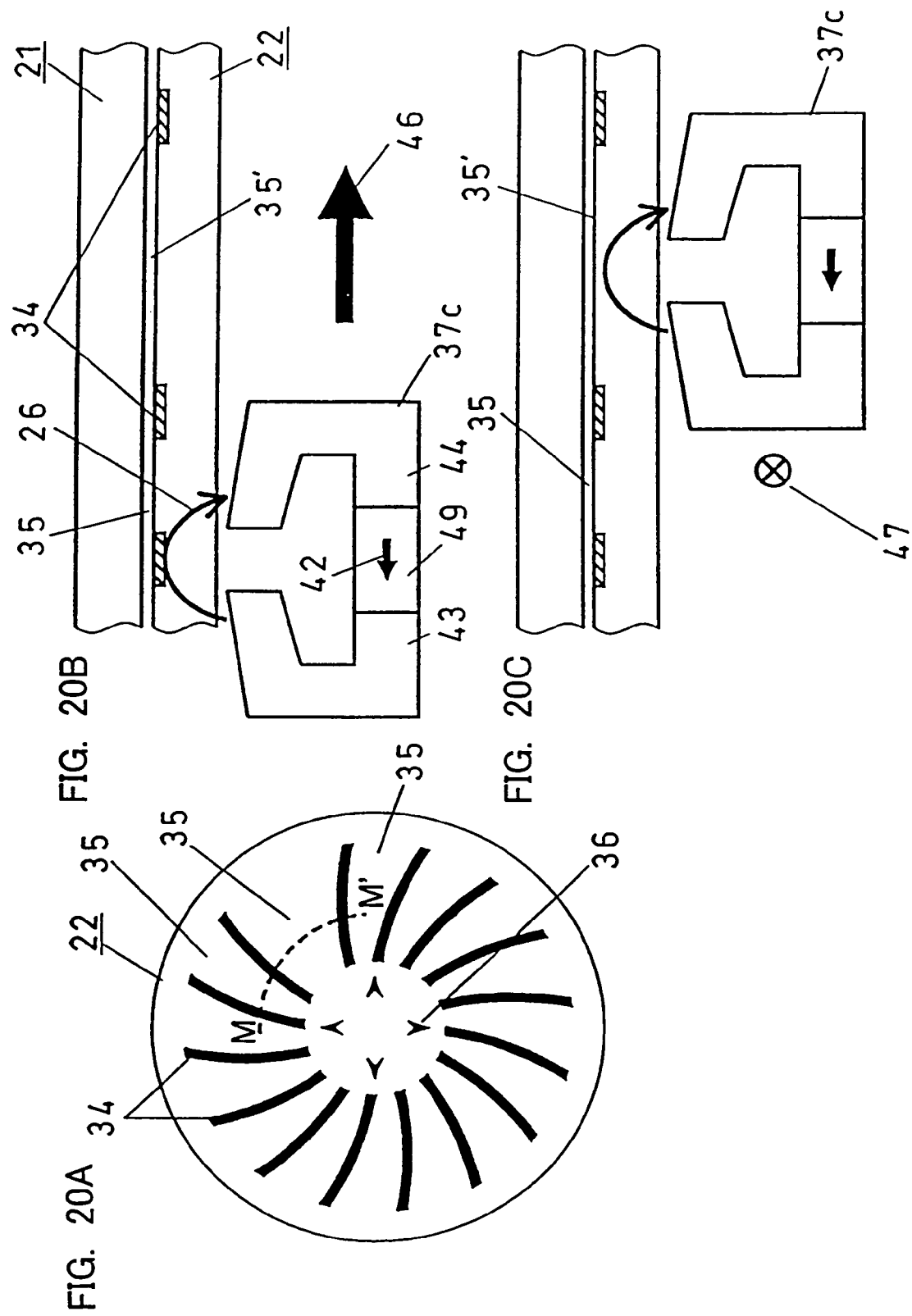

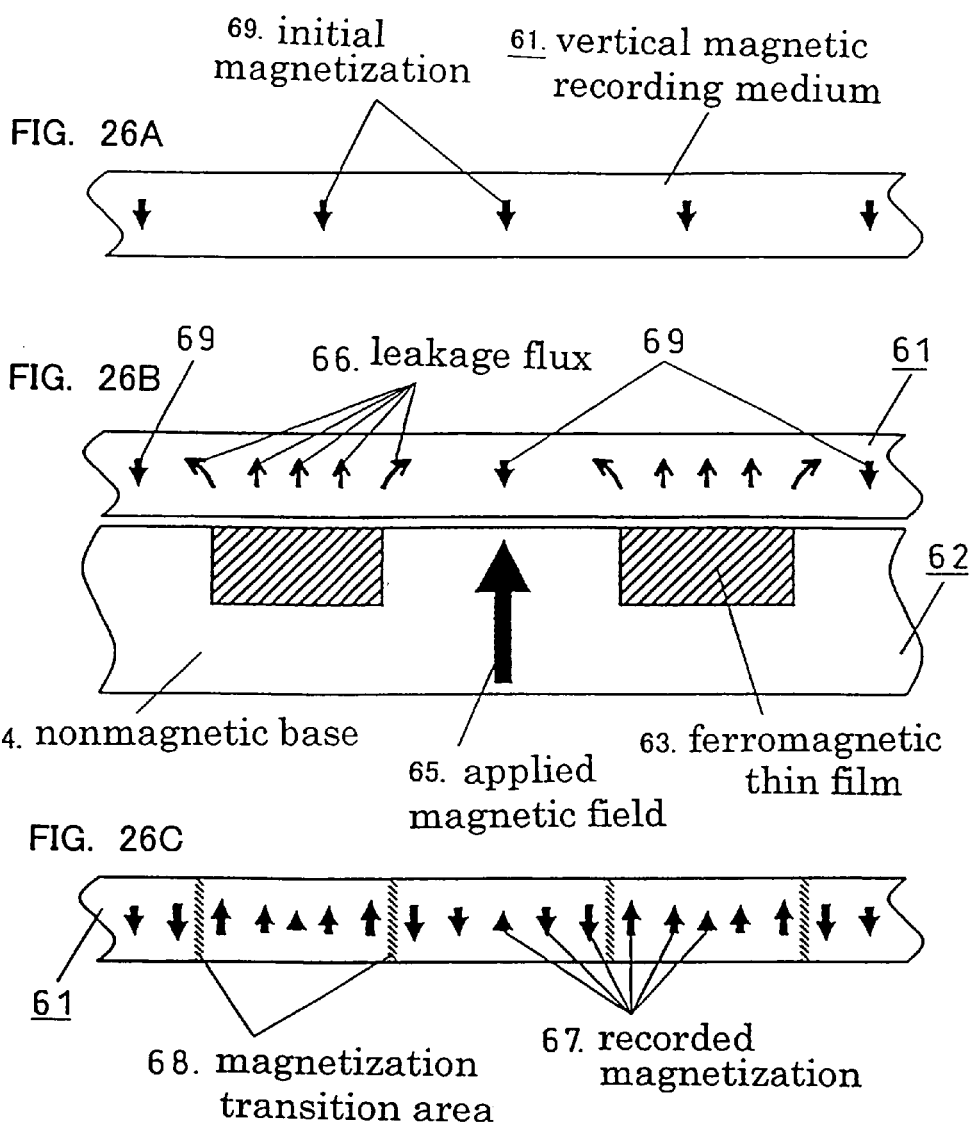

MASTER INFORMATION CARRIER AND METHOD FOR MANUFACTURING MAGNETIC DISC USING THE SAME

This application is a continuation of U.S. patent application Ser. No. 09/979,872, filed Nov. 27, 2001, which is a 371 of International Application No. PCT/JP01/02697, filed Mar. 29, 2001.

TECHNICAL FIELD

The present invention relates to a master information carrier used for performing a preformat recording of specific information for a magnetic disc and a method for manufacturing a magnetic disc using the same.

BACKGROUND ART

At present, magnetic recording reproduction devices are being designed to have higher recording density in order to achieve a large capacity with a small size. In the field of a hard disc drive, which is a typical magnetic storage device, a device having an areal recording density of more than 10 Gbits/in$^2$ is commercialized already, and such a rapid progress in the technology can be observed that even the practical use of a device with 20 Gbits/in$^2$ is discussed.

As the technical background for enabling such high recording density, significant factors are the improvement in the performance of a medium and in the performance of a head-disc interface as well as the improvement in the linear recording density achieved by the appearance of a new signal processing mode such as a partial response. Here, the partial response is a mode of intentionally providing a known intersymbol interference at the time of waveform equalization conducted for avoiding an intersymbol interference when the linear recording density is increased. This mode is characterized in that the deterioration of a bit error rate can be prevented compared to a conventional peak detection or an integral detection.

In recent years, however, in addition to the appearance of such a signal processing mode, the main factor for improving the surface recording density is that the tendency toward an increase in the track density is significantly exceeding the tendency toward an increase in the linear recording density. This is due to the fact that a magneto-resistive type head, which has exceedingly excellent reproduction output performance compared to a conventional inductive type magnetic head, has come into practical use. At present, due to the commercialization of the magneto-resistive type head, a signal with a track width as small as several μm can be reproduced at an excellent S/N ratio. On the other hand, along with a further improvement in the performance of the head in the years to come, a track pitch is expected to reach the submicron range in the near future.

Now, for a magnetic head to scan such narrow tracks accurately and to reproduce signals at an excellent S/N ratio, the tracking servo technology of the head plays an important role. As for such tracking servo technology of present hard disc drives, recording tracks are formed in circular manner on a hard disc. And within a revolution of the disc, that is, within an angle of 360 degrees, a single region called a wedge is repeatedly provided at a constant interval, where a servo signal for tracking, an address information signal and a reproduction clock signal etc. are recorded. Hereinafter, the servo signal for tracking, the address information signal and the reproduction clock signal etc. are referred to as preformat signals, and the process of recording these signals in advance is referred to as a preformat recording. The magnetic head reproduces these signals at a constant interval so as to scan on the tracks accurately while identifying and correcting the position of the head.

The above-mentioned preformat signals such as the servo signal for tracking, the address information signal and the reproduction clock signal serve as reference signals for the magnetic head to scan accurately on the tracks. Therefore, when these signals are recorded, positioning is required to be performed correctly with precision. In a present hard disc drive, after a disc is incorporated into the drive, by using a single-purpose servo recording device called a servo track writer, a preformat recording is performed by strictly controlling the position of a magnetic head.

The preformat recording of the signals such as the servo signal for tracking, the address information signal and the reproduction clock signal by the magnetic head with the use of the single-purpose servo track writer as mentioned above has the following problems.

First, a recording by a magnetic head basically is a linear recording based on the relative movement of a head and a medium. Therefore, the above-mentioned method for recording by strictly controlling the position of the magnetic head with the single-purpose servo track writer requires a great amount of time for the preformat recording. In addition, since the single-purpose servo track writer is quite expensive, the cost for the preformat recording becomes extremely high.

Secondly, due to a spacing between the head and the medium, and due to a broadening of a recording magnetic field caused by the pole shape of the recording head, the magnetic transition lacks in sharpness in the track edge portion of the recorded preformat signals. In the present tracking servo technology, the position of a head is detected by the change in the reproduction output amplitude at the time when the head went off-track and scanned. Therefore, with regard to the signal tracks where the preformat recording was performed, the reproduced signal is not only required to have an excellent S/N ratio when scanning accurately on the tracks just as when data signals recorded between servo areas are reproduced, but also to have a steep change in the reproduction output amplitude at the time when the head went off-track and scanned, that is, sharp off-track characteristics. The above problem goes against this requirement, which makes it difficult to provide the accurate tracking servo technology for recording of submicron tracks in the years to come.

Now, as means to solve the problems in the preformat recording by the magnetic head as mentioned above, the preformat recording technology proposed by the present inventors in JP10(1998)-40544A mainly is the technology of using a master information carrier including a base on which a pattern of ferromagnetic thin films corresponding to information signals is formed, and bringing the surface of the master information carrier into contact with the surface of a magnetic recording medium so as to perform a surface transcription recording as a whole of a magnetization reversal pattern corresponding to the pattern of the ferromagnetic thin films formed on the surface of the master information carrier for a magnetic recording medium.

According to the configuration disclosed by the same publication, the magnetization reversal pattern corresponding to the pattern of the ferromagnetic thin films in the master information carrier is transcribed and recorded in the lump on the magnetic recording medium by a recording magnetic field arising from the ferromagnetic thin films formed on the surface of the master information carrier, which is magnetized in one direction. In other words, by forming patterns of the ferromagnetic thin films corresponding to the servo signal for tracking, the address information signal and the reproduction clock signal etc. on the surface of the master information carrier by the photolithographic technique etc., the information signals corresponding thereto can be recorded in the magnetic recording medium for the preformat recording.

While a recording by a conventional magnetic head basically is a dynamic linear recording based on the relative movement of a head and a medium, the above-mentioned configuration is characterized in that this recording is a static areal recording without accompanying relative movement of the master information carrier and the medium. Due to such a feature, the technology disclosed in JP10(1998)-40544A can be extremely effective for solving the above-mentioned problems related to the preformat recording, as will be explained below.

First, due to the feature of surface recording, the time required for the preformat recording is much shorter than that for recording by the conventional head. Moreover, the expensive servo track writer for recording while strictly controlling the position of the magnetic head is not required. Therefore, the productivity related to the preformat recording can be improved significantly, and at the same time, the production cost can be reduced.

Secondly, due to the feature of static recording without accompanying relative movement of the master information carrier and the medium, a spacing between the surface of the master information carrier and the surface of the magnetic recording medium at the time of recording can be reduced to a minimum by securely contacting them to each other. Moreover, the broadening of a recording magnetic field due to the pole shape of the recording head does not occur as in the case with the recording by a magnetic head. Therefore, the magnetic transition at the track edge portion where the preformat recording was performed has excellent sharpness compared with the recording by a conventional magnetic head, and more accurate tracking is possible.

One example of the surface configuration of a conventional master information carrier disclosed in the same publication is shown in FIG. 21. FIG. 21 shows a disc-shaped master information carrier configured so as to perform a lump sum recording of preformat signals for a magnetic recording medium such as a hard disc, and wedge pattern areas 74 are formed in one circle of a disc, that is, over an angle of 360 degrees at a constant interval, with pattern shapes of ferromagnetic thin films corresponding to preformat signals such as a servo signal for tracking, an address information signal and a reproduction clock. In addition, 75 shows areas between wedges, and these areas correspond to data areas on a magnetic recording medium. Also, 76 is a marker used for positioning the magnetic recording medium at the time when it is closely contacted with the surface of the master information carrier.

An enlarged view of a portion A of the master information carrier shown in FIG. 21 is shown in FIG. 22. FIG. 22 shows the pattern configuration of ferromagnetic thin films 63 formed according to the preformat signals inside the wedge, which is provided at a constant angle in the circumferential direction of the magnetic recording medium, only for 10 tracks in the radial direction of a master information carrier 62 (that is, in the direction of recording track width). Also for reference, in the area between wedges 75, track portions where data will be recorded on the magnetic recording medium after the preformat signals are recorded in the magnetic recording medium are shown by broken lines. On the surface of an actual master information carrier, patterns of the ferromagnetic thin films as shown in FIG. 22 are formed, according to the recording area of the magnetic recording medium where the preformat signals are recorded, at a constant angle in the circumferential direction and also for all the recording tracks in the radial direction of the disc.

The preformat signals are formed as arrays of the ferromagnetic thin films 63 included, for example as shown in FIG. 22, in the areas of the clock signal, the servo signal for tracking, the address information signal etc., and each area is arranged sequentially in the longitudinal direction of the track on the surface of the master information carrier 62. The hatched portions in FIG. 22 are the ferromagnetic thin films 63. In addition, the planar shapes of the ferromagnetic thin films 63 in FIG. 22 are all rectangular, but in fact the shapes are not limited thereto and can be formed into different shapes according to the embodiment.

FIG. 23 and FIG. 24 show examples of cross-sectional configurations of the master information carrier of FIG. 22 taken on alternate long and short dash line LL'. The alternate long and short dash line LL' corresponds to the circumferential direction of the magnetic recording medium, and the lateral direction of the surface also matches the time base direction of the signal at the time when the signal recorded in the magnetic recording medium is reproduced by a magnetic head. The magnetic information carrier 62 may be configured such that pattern shapes made of the ferromagnetic thin films 63 are buried and arranged in a surface portion of a nonmagnetic base 64 as shown in FIG. 23, or such that pattern shapes made of the ferromagnetic thin films 63 are arranged in the form of protrusions on the surface of the nonmagnetic base 64 as shown in FIG. 24. However, in view of durability or long-life of the master information carrier, the configuration shown in FIG. 23 is superior.

In the above-mentioned conventional preformat technology, the patterns of the ferromagnetic thin films on the surface of the master information carrier correspond to the magnetized pattern to be recorded in the magnetic recording medium. Therefore, the patterns of the ferromagnetic thin films should be arranged, for example, in and on the surfaces of the master information carriers illustrated in FIG. 23 and FIG. 24 such that a pattern length A of each ferromagnetic thin film or a distance B between the individual patterns of the ferromagnetic thin films corresponds to a desired signal length in a magnetized pattern to be recorded in a magnetic recording medium, that is, to a length between a pair of magnetic transition areas adjacent to each other in the magnetized pattern.

However, according to the examinations conducted by the present inventors, the length between the magnetic transition areas in the magnetized pattern recorded on the magnetic recording medium in fact does not accurately match the length A of each pattern of the ferromagnetic thin films and the distance B between the individual patterns of the ferromagnetic thin films. Therefore, when the pattern length A of the ferromagnetic thin films or the distance B between the patterns of the ferromagnetic thin films is set so as to match the length between the magnetic transition areas desired on the magnetic recording medium accurately, the length between the magnetic transition areas actually recorded on the magnetic recording medium differs from the desired length. As a result, with regard to a reproduction waveform at the time when the recorded magnetized pattern is reproduced by a magnetic head, the position of the reproduction pulse is shifted from the desired pulse position by a certain time.

In this case, it would not be a problem when the shift quantity of the reproduction pulse mentioned above is sufficiently small in ratio to a detection window width of a reproduction signal processing circuit. However, when the amount exceeds the permissible limit of the detection window width, the reproduction signal processing circuit cannot detect the reproduction pulse, so that a reproduction signal error arises.

Furthermore, the preformat recording using the master disc disclosed in the same publication is effective not only for a conventional in-plane magnetic recording medium but also for a vertical magnetic recording medium to be used for performing super high density recording in the future, and the development of its application is awaited.

The magnetic recording method for recording in a vertical magnetic recording medium disclosed in the same publication will be explained below. FIG. 25A to FIG. 25C are cross-sectional views of a vertical magnetic recording medium 61 taken in the circumferential direction of a disc, and the lateral direction of the surface matches the time base direction at the time when a magnetized pattern to be recorded in the vertical magnetic recording medium 61 is reproduced by a magnetic head.

First, as shown in FIG. 25A, the vertical magnetic recording medium 61 where preformat signals are recorded is prepared. Next, as shown in FIG. 25B, the surface of the master information carrier 62 is contacted closely with the surface of the vertical magnetic recording medium 61, and an external magnetic field 65 is applied in the direction perpendicular to the surface of this master information carrier 62. In addition, the example shown in FIG. 25B uses the master information carrier according to the configuration of FIG. 23, but the master information carrier according to the configuration of FIG. 24 may be used as well.

By applying the magnetic field 65, leakage flux 66 corresponding to the shape pattern of the ferromagnetic thin films 63 is generated on the surface of the master information carrier 62. Accordingly, recorded magnetization 67 with a pattern corresponding to the shape pattern of the ferromagnetic thin films 63 is formed in the vertical magnetic recording medium 61 as shown in FIG. 25C.

As a result, as shown in FIG. 25C, in the vertical magnetic recording medium 61, a magnetized pattern, which includes a non-recorded area corresponding to a portion between the ferromagnetic thin films on the surface of the master information carrier and an area where magnetization was recorded by the leakage flux from the ferromagnetic-thin films, is formed in which the two areas are arranged alternately via a magnetic transition area 68. In addition, the recorded magnetized pattern of FIG. 25C shows a case in which the vertical magnetic recording medium 61 is erased to a neutral point in advance by applying a magnetic field alternately in opposite directions or through application of a thermomagnetization method or the like prior to the recording by using the master information carrier 62.

On the other hand, as shown in FIG. 26A, prior to the operation of closely contacting the vertical magnetic recording medium 61 with the surface of the master information carrier 62, by applying a d.c. magnetic field to the vertical magnetic recording medium 61 and providing initial magnetization 69, as shown in FIG. 26C, it is possible to form the recorded magnetization 67 with a pattern including the residual magnetization of the initial magnetization 69 and the magnetization recorded by the leakage flux 66, arranged alternately via the magnetic transition area 68. In this case, the polarity of the initial magnetization 69 should be opposite to the polarity of the applied magnetic field 65. When the magnetized pattern recorded in the vertical magnetic recording medium 61 is reproduced by using a magnetic head, about twice as large a reproduction signal amplitude can be obtained from the recorded magnetized pattern shown in FIG. 26C as that from the recorded magnetized pattern shown in FIG. 25C, so that this configuration is more preferable.

In this way, as shown in FIG. 25B and FIG. 26B, when a preformat recording is performed for a vertical magnetic recording medium, by applying the magnetic field 65 in the direction perpendicular to the surface of the master information carrier 62, the ferromagnetic thin films 63 are magnetized in the vertical direction of the film surface, that is, in the thickness direction. However, it became clear that sufficient vertical recording performance cannot necessarily be obtained by such a method.

This principle will be explained by referring to FIG. 27. 80 shows a vertical magnetic field distribution in the vicinity of the master information carrier surface obtained by the leakage flux 66 from the applied magnetic field 65 and the ferromagnetic thin films 63. In order to obtain excellent recording performance by the magnetic recording method disclosed in the same publication, by focusing magnetic flux on the ferromagnetic thin film portions having high magnetic permeability inside the master information carrier, the magnetic field at the portion between the individual ferromagnetic thin films needs to be reduced sufficiently compared to the volume of the applied magnetic field (the level shown by a straight line 81) and the magnetic field at the ferromagnetic thin film surface needs to be increased sufficiently compared to the volume of the applied magnetic field (the level shown by the straight line 81).

However, as a result of further examinations conducted by the present inventors, it became clear that it is difficult to obtain the preferable vertical magnetic field distribution as described above by the method disclosed in the same publication. In other words, a demagnetizing field in the direction perpendicular to the film surface is strong inside the ferromagnetic thin films 63, so that sufficiently large leakage magnetic flux 66 contributing to the recording, that is, a magnetic field in the vertical direction, cannot be obtained at the surface of the ferromagnetic thin films 63.

Furthermore, since the magnetic flux is not focused sufficiently on the ferromagnetic thin films 63 inside the master information carrier, a strong vertical magnetic field exceeding the half of the applied magnetic field 65 is generated also at the portion between the ferromagnetic thin films 63. As a result, the recorded magnetization 67 in the vertical magnetic recording medium 61 becomes much smaller than the value of the residual magnetization intrinsic in the vertical magnetic recording medium 61, and the amplitude of a reproduction waveform 82 reproduced from this recorded magnetized pattern (See FIG. 27) becomes much smaller than a reproduction signal amplitude 83 reproduced from the magnetized pattern recorded by a conventional magnetic head.

This problem can be solved to some degree by increasing the thickness of the ferromagnetic thin films 63 on the master information carrier 62 and reducing the demagnetizing field inside the ferromagnetic thin films; However, in order to obtain sufficient improvement by the above-mentioned method, it is necessary to increase the thickness relative to the pattern length of the ferromagnetic thin films shown in the cross-sectional view of FIG. 27 at least as much as twice to three times. To form a shape pattern of ferromagnetic thin films having such a high aspect rate is extremely difficult from the viewpoint of the lithographic technique used in the manufacturing process of a master information carrier.

In order to obtain a larger reproduction signal amplitude with the conventional method disclosed in the same publication, as shown in FIG. 26A, it is necessary to erase the magnetization in the vertical magnetic recording medium 61 by applying a d.c. magnetic field prior to the operation of closely contacting the vertical magnetic recording medium 61 with the surface of the master information carrier 62, and to provide the initial magnetization 69 for the vertical magnetic recording medium 61.

However, a vertical magnetic recording medium has a strong demagnetizing field in the direction perpendicular to the film surface of a magnetic layer, so that it is difficult to realize the d.c. erasing state uniformly and stably in a large area over the entire disc surface. That is, due to the demagnetizing field at the time when the magnetization is erased by applying a d.c. magnetic field, the initial magnetization 69 in the vertical magnetic recording medium 61 becomes extremely small compared to the value of the residual magnetization intrinsic in the vertical magnetic recording medium 61.

Furthermore, in the course of time after the application of a d.c. magnetic field, the magnetic domains in which the magnetization is locally reversed by the demagnetizing field increase, so that the initial magnetization 69 is further demagnetized. Therefore, it is difficult to obtain a uniform and sufficiently large reproduction signal amplitude over the entire disc surface by the conventional method described above.

In view of the foregoing problems, it is a first object of the present invention to solve the above-mentioned problems in the preformat technology disclosed in JP10(1998)10-40544A and to provide a master information carrier capable of recording preformat signals causing no reproduction signal errors in an in-plane magnetic recording medium by approximating a length between magnetic transition areas of a magnetized pattern to be recorded in an in-plane magnetic recording medium by a preformat recording to a more desirable set point, and also to provide an in-plane magnetic recording medium capable of accurate servo tracking by using this master information carrier. Furthermore, a second object is to provide a master information carrier capable of recording preformat signals in a vertical magnetic recording medium exhibiting a uniform and sufficient large reproduction signal amplitude over the entire disc surface, and also to provide a vertical magnetic recording medium capable of accurate servo tracking by using this master information carrier.

DISCLOSURE OF THE INVENTION

In order to achieve the first object mentioned above, a first configuration of a master information carrier according to the present invention has an array of ferromagnetic films formed on a base surface according to information signals, the master information carrier being used for forming a magnetized pattern corresponding to the array of the ferromagnetic films in an in-plane magnetic recording medium through application of a magnetic field with the master information carrier opposing the in-plane magnetic recording medium, wherein a length of each ferromagnetic film is larger than a length between magnetic transition areas of the magnetized pattern to be formed by the ferromagnetic film in the in-plane magnetic recording medium.

Furthermore, to achieve the first object mentioned above, a second configuration of a master information carrier according to the present invention has an array of ferromagnetic films formed on a base surface according to information signals, the master information carrier being used for forming a magnetized pattern corresponding to the array of the ferromagnetic films in an in-plane magnetic recording medium through application of a magnetic field with the master information carrier opposing the in-plane magnetic recording medium, wherein a distance between neighboring ferromagnetic films is smaller than a length between magnetic transition areas of the magnetized pattern to be formed by each ferromagnetic film in the in-plane magnetic recording medium.

When the magnetic field is applied to the master information carrier, the magnetic transition areas of the magnetized patterns formed by the leakage magnetic flux from each ferromagnetic film in the in-plane magnetic recording medium are located on the inner side rather than the both edge portions of the ferromagnetic films. Therefore, according to the first and second configurations mentioned above, the length between the magnetic transition areas of the magnetized pattern formed in the in-plane magnetic recording medium can be determined as desired. Thus, a master information carrier capable of recording information signals without a pulse shift in an in-plane magnetic recording medium can be provided.

Furthermore, to achieve the first object, a first method for manufacturing a magnetic recording medium according to the present invention includes the steps of overlapping the master information carrier according to the above-mentioned first or second configurations on an in-plane magnetic recording medium, applying a magnetic field and thus performing a preformat recording of the magnetized pattern corresponding to the array of the ferromagnetic films in the master information carrier for the in-plane magnetic recording medium. Accordingly, an in-plane magnetic recording medium without reproduction signal detection errors can be provided.

In order to achieve the second object mentioned above, a second method for manufacturing an information recording medium according to the present invention is a manufacturing method for a magnetic recording medium including the step of applying a magnetic field while opposing a master information carrier provided with an array of ferromagnetic films formed according to information signals on a base surface against a surface of a vertical magnetic recording medium and thus performing a preformat recording of a magnetized pattern corresponding to the array of the ferromagnetic films for a magnetic layer in the vertical magnetic recording medium, wherein the magnetic field is applied parallel to the surface direction of the ferromagnetic film and to the magnetic layer of the vertical magnetic recording medium.

According to this method, the demagnetizing field in the respective ferromagnetic films is small, and magnetic paths with small magnetic resistance are formed successively in the in-plane of the master information carrier, so that leakage flux with a sufficiently large vertical directional component compared to the volume of the applied magnetic field can be obtained. As a result, a large magnetic field amplitude with reversed polarities to each other can be obtained in the vicinity of the both edges of the ferromagnetic film. Thus, without providing initial magnetization in advance, a vertical magnetic recording medium can be manufactured in which a preformat recording of information signals with large reproduction signal amplitudes is performed.

BRIEF DESCRIPTION OF THE DRAWINGS

FIG. 5A to FIG. 5C are explanatory diagrams schematically showing another example of performing the step of preformat recording for an in-plane magnetic recording medium using the above-mentioned master information carrier.

FIG. 15A is a plan view showing the configuration of a master information carrier according to the second embodiment; FIG. 15B and FIG. 15C are explanatory diagrams schematically showing one example of operating a magnetic transcription head at the time of performing a preformat recording using this master information carrier.

FIG. 17A is a plan view showing the configuration of a master information carrier according to the second embodiment; FIG. 17B and FIG. 17C are explanatory diagrams schematically showing another example of operating a magnetic transcription head at the time of performing a preformat recording using this master information carrier.

FIG. 20A is a plan view showing the configuration of a master information carrier according to the second embodiment; FIG. 20B and FIG. 20C are explanatory diagrams schematically showing yet another example of operating a magnetic transcription head at the time of performing a preformat recording using this master information carrier.

FIG. 26A to FIG. 26C are explanatory diagrams schematically showing another example of performing the conventional step of preformat recording for a vertical magnetic recording medium using a master information carrier.

BEST MODE FOR CARRYING OUT THE INVENTION

In the following, embodiments of the present invention will be explained in detail.

[First Embodiment]

Figure 4A:
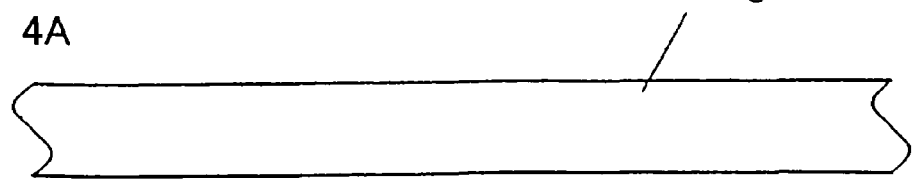
FIG. 4A to FIG. 4C are explanatory diagrams schematically showing one example of performing the step of preformat recording for an in-plane magnetic recording medium using the above-mentioned master information carrier.
Figure 4B:
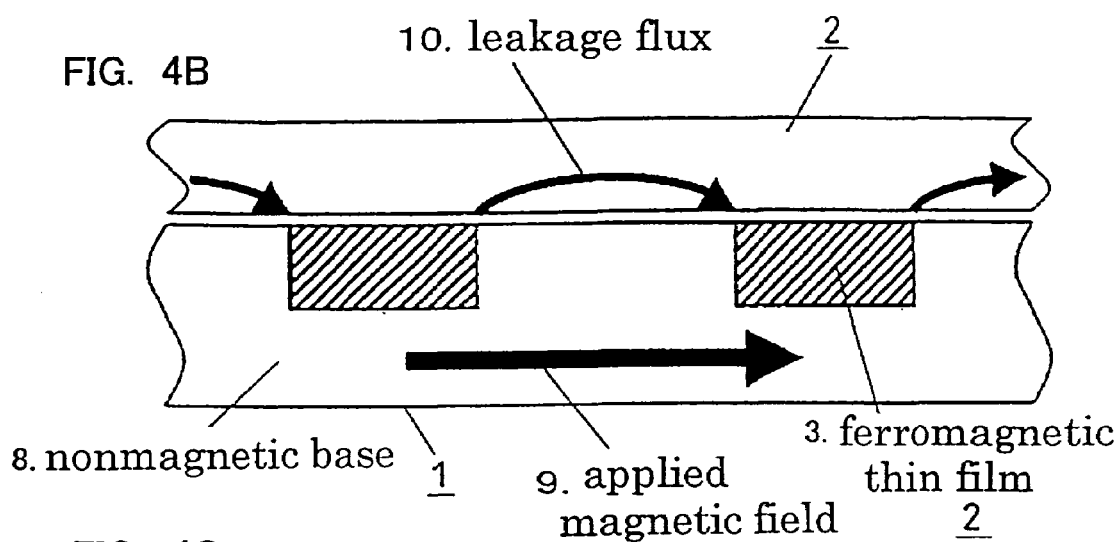
Figure 4C:
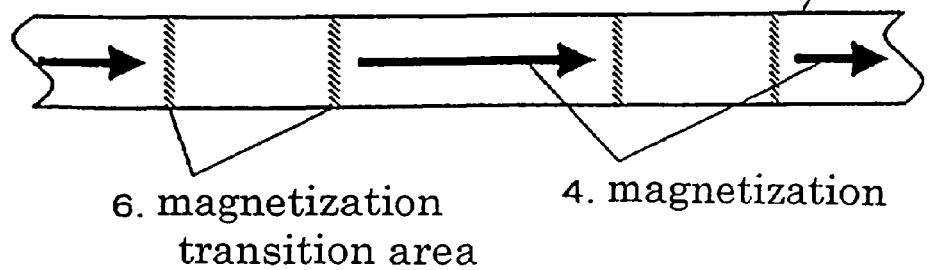

First, the step of recording preformat signals, which is performed as one of the steps for manufacturing an in-plane magnetic recording medium, will be explained briefly by referring to FIG. 4A to FIG. 4C. FIG. 4A to FIG. 4C are cross-sectional views taken in the circumferential direction of a disc of an in-plane magnetic recording medium 2, and the lateral direction of the surface also matches the time base direction at the time when a magnetized pattern to be recorded in the in-plane magnetic recording medium 2 is reproduced with a magnetic head.

First, as shown in FIG. 4A, the in-plane magnetic recording medium 2 is prepared. In addition, the magnetization of the in-plane magnetic recording medium 2 shown in FIG. 4A is erased to a neutral point in advance by applying a magnetic field alternately in opposite directions or through application of a thermomagnetization method or the like.

Next, as shown in FIG. 4B, the side face of a master information carrier 1 where ferromagnetic thin films 3 are formed is contacted closely with the surface of the in-plane magnetic recording medium 2, and a magnetic field 9 is applied. In addition, the example shown here uses a master information carrier in which the ferromagnetic thin films 3 are buried in the in-plane, but a master information carrier on which the ferromagnetic thin films 3 are formed as protrusions may be used as well.

By applying the magnetic field 9, leakage flux 10 corresponding to a shape pattern of the ferromagnetic thin films 3 is generated on the surface of the master information carrier 1. Accordingly, magnetization 4 with a pattern corresponding to the shape pattern of the ferromagnetic thin films 3 is formed in the in-plane magnetic recording medium 2 as shown in FIG. 4C.

As shown in FIG. 4C, the in-plane magnetic recording medium 2 now has a magnetized pattern including a non-recorded area, which is a portion facing the surface of the ferromagnetic thin films 3, and an area where the magnetization 4 is recorded by the leakage flux 10, in which the two areas are arranged alternately via a magnetic transition area 6.

On the other hand, as shown in FIG. 5A, it is also possible to equally erase the in-plane magnetic recording medium 2 by applying a d.c. magnetic field in one direction and to provide initial magnetization 11, and then, as shown in FIG. 5B, to contact the in-plane magnetic recording medium 2 closely with the surface of the master information carrier 1 and to apply the magnetic field 9. Accordingly, as shown in FIG. 5C, a magnetized pattern can be recorded in which residual magnetization 4a from the initial magnetization 11 and magnetization 4b recorded by the leakage flux 10 are arranged alternately via the magnetic transition area 6. At this time, the polarity of the initial magnetization 11 should be the opposite polarity to the polarity of the applied magnetic field 9. When the magnetized pattern recorded in the in-plane magnetic recording medium 2 is reproduced by using a magnetic head, about twice as large a reproduction signal amplitude can be obtained by the method shown in FIG. 5A to FIG. 5C as that obtained by the method shown in FIG. 4A to FIG. 4C.

Here, referring to FIG. 1, the relationship between the pattern of the ferromagnetic thin films formed on the master information carrier 1 of the present embodiment, the magnetized pattern to be recorded by the preformat recording in the in-plane magnetic recording medium 2 by this master information carrier 1 and a reproduction waveform of this magnetized pattern reproduced by a magnetic head will be explained. In addition, in FIG. 1, the master information carrier 1 and the in-plane magnetic recording medium 2 are shown in cross-section taken in the circumferential direction of the disc, and the lateral direction of the surface matches the time base direction at the time when the magnetized pattern to be recorded in the in-plane magnetic recording medium 2 is reproduced by using the magnetic head.

Figure 1:
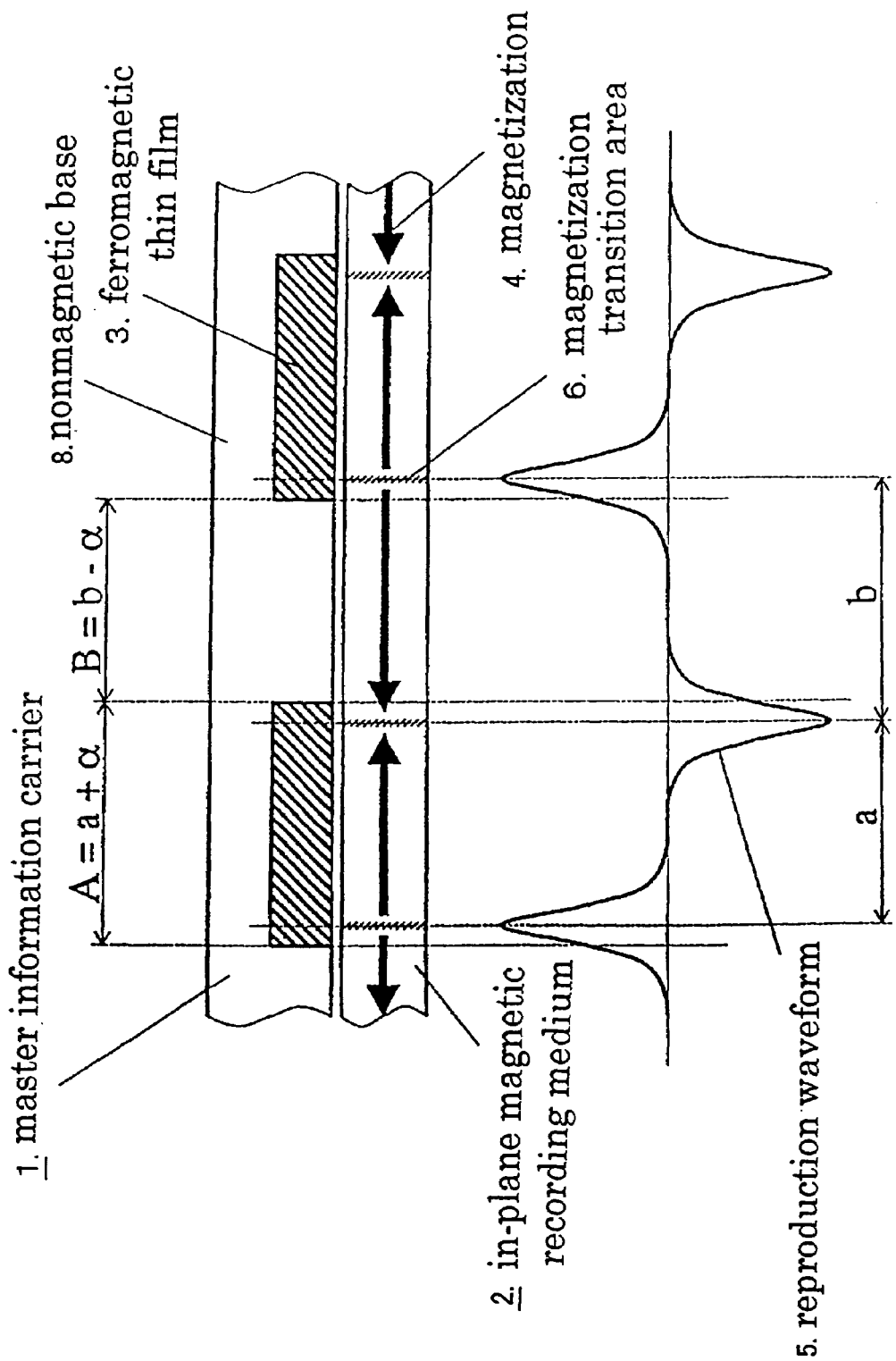
FIG. 1 is an explanatory diagram schematically showing a configuration example of a master information carrier according to an embodiment of the present invention and the relationship with a reproduction waveform obtained by reproducing preformat signals recorded with the use of this master information carrier by a magnetic head.
Figure 6:
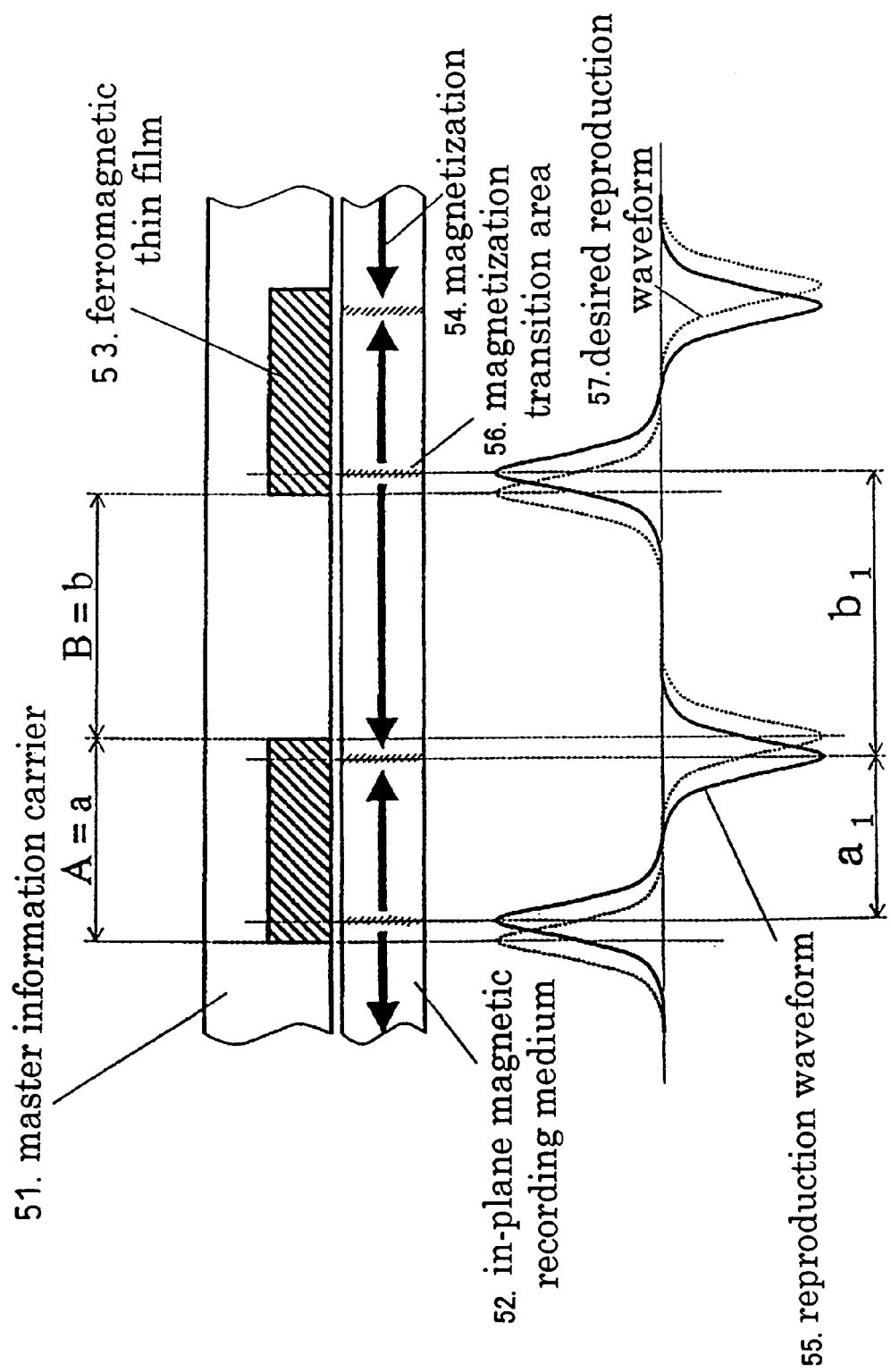
FIG. 6 is an explanatory diagram schematically showing a configuration example of a conventional master information carrier and the relationship with a reproduction waveform obtained by reproducing preformat signals recorded with the use of this master information carrier by a magnetic head.

Now, for the purpose of comparing with FIG. 1, a conventional master information carrier used in the preformat technology, a magnetized pattern recorded by a preformat recording in a conventional in-plane magnetic recording medium by this master information and a reproduction waveform of this magnetized pattern are shown in FIG. 6. In addition, the in-plane magnetic recording media 2 shown in FIG. 1 and FIG. 6 are provided in advance with the initial magnetization 11 and then recorded by the preformat recording as already explained by using FIG. 5A to FIG. 5C.

As shown in FIG. 6, according to the configuration in the conventional example, a pattern length A of the ferromagnetic thin films and a distance B between the patterns of the ferromagnetic thin films in a master information carrier 51 accurately match lengths between magnetic transition areas a and b desired on an in-plane magnetic recording medium 52.

According to the examinations conducted by the present inventors, it became clear that in the in-plane magnetic recording medium 52 in which the preformat recording was performed by using the conventional master information carrier 51, a magnetic transition area 56 in the actually recorded magnetized pattern is not located in an area corresponding to both edges of ferromagnetic thin films 53 but is located in an area that is slightly shifted inside from the both edges of the ferromagnetic thin film 53, as shown in FIG. 6.

Thus, an actual length between the magnetic transition areas $a_1$ in the portion corresponding to the pattern length A of the ferromagnetic thin films becomes shorter than the desired value a on the in-plane magnetic recording medium 52. On the contrary, an actual length between the magnetic transition areas $b_1$ in the portion corresponding to the distance B between the patterns of the ferromagnetic thin films becomes longer than the desired value b on the in-plane magnetic recording medium 52.

Accordingly, when the recorded magnetized pattern is reproduced by the magnetic head, there is a pulse shift arising between an actual reproduction waveform 55 and a desired reproduction waveform 57, which corresponds to the difference between a and $a_1$ or b and $b_1$ as shown in the drawing. When this quantity of pulse shift exceeds the permissible limit of a detection window width of a reproduction signal processing circuit, the reproduction signal processing circuit cannot detect the reproduced pulse, so that a reproduction signal error occurs.

Figure 23:
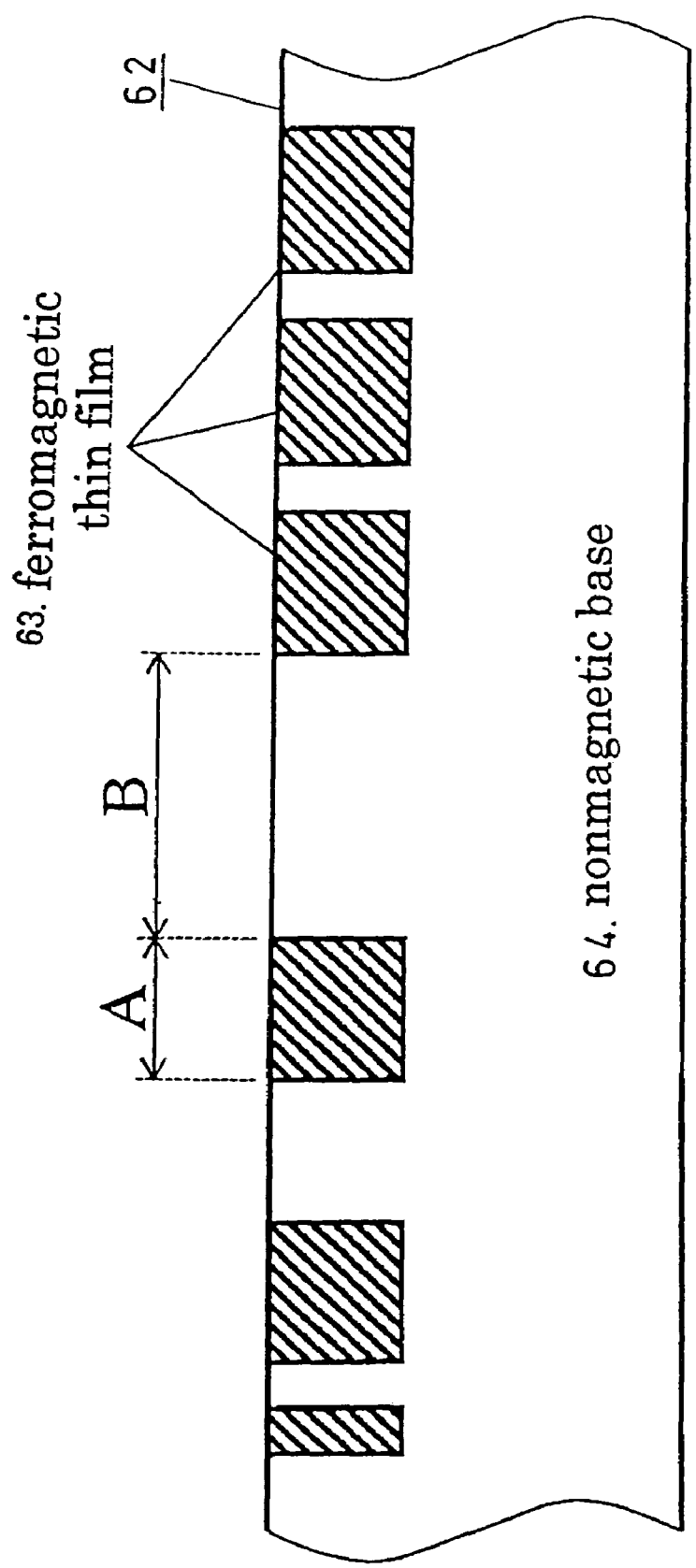
FIG. 23 is a cross-sectional view showing a configuration example of a conventional master information carrier.
Figure 24:
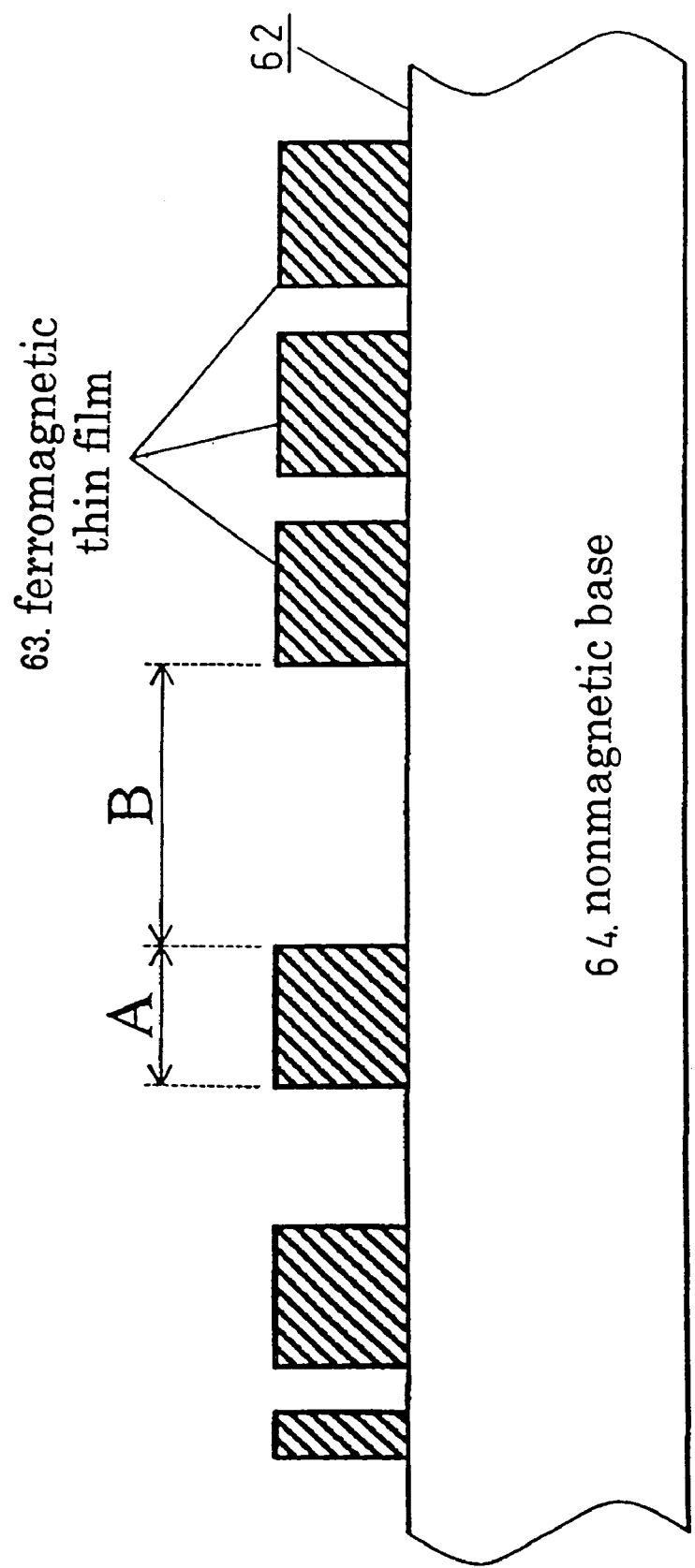
FIG. 24 is a cross-sectional view showing another configuration of a conventional master information carrier.
Figure 25A:
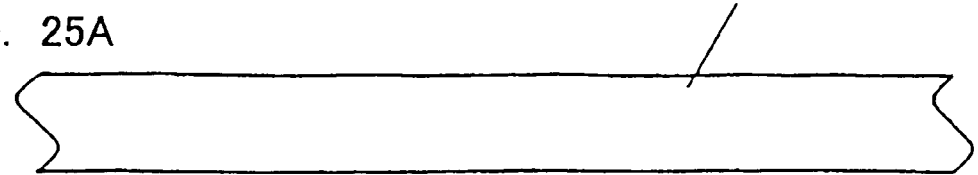
FIG. 25A to FIG. 25C are explanatory diagrams schematically showing one example of performing the conventional step of preformat recording for a vertical magnetic recording medium using a master information carrier.
Figure 25B:
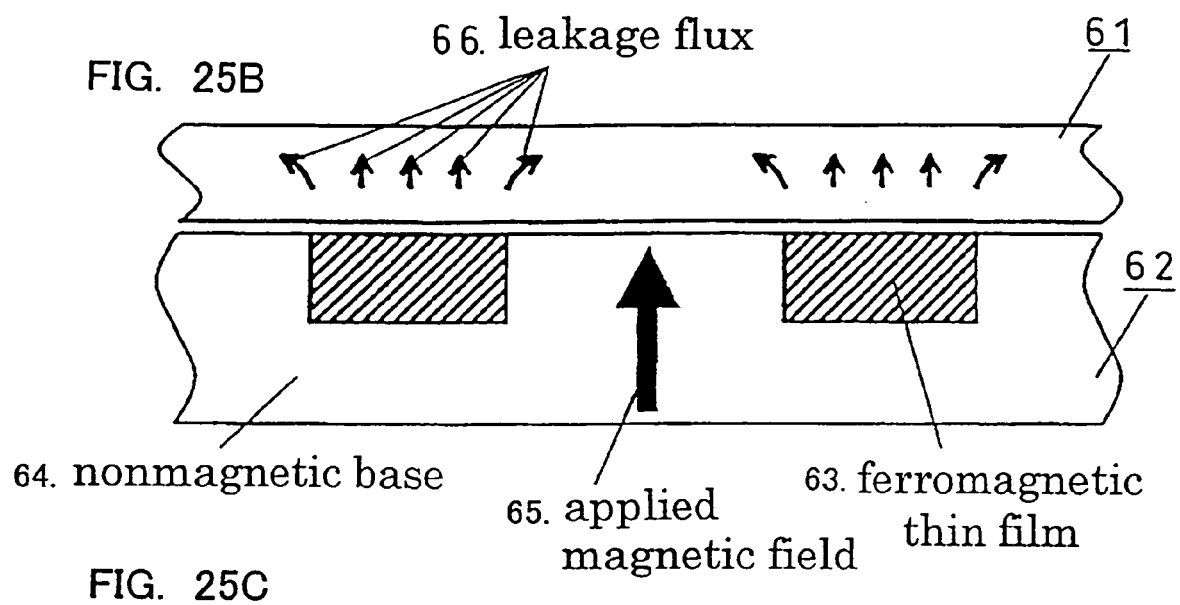
Figure 25C:
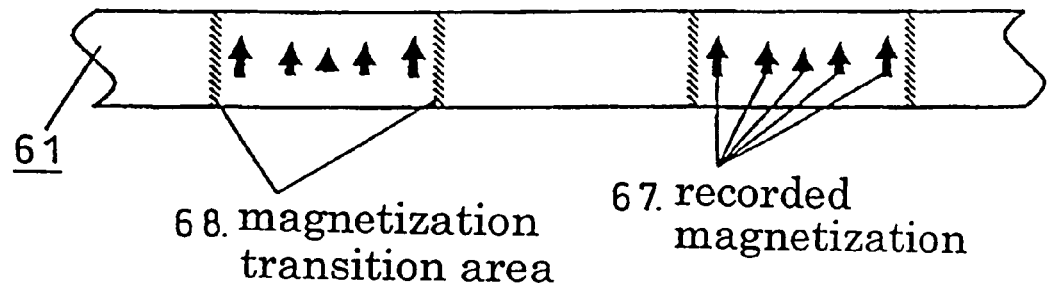

On the contrary, as shown in FIG. 1, in the master information carrier 1 of the present invention, the shift quantity of the magnetic transition area 6 from the end portions of the ferromagnetic thin film 3 is taken into account so as to obtain the desired lengths between the magnetic transition areas a and b in the magnetized pattern recorded on the in-plane magnetic recording medium 2, and therefore, the pattern length A of the ferromagnetic thin films 3 and the distance B between the patterns (See FIG. 23 and FIG. 24) are corrected in advance.

In other words, the pattern length A of the ferromagnetic thin films 3 is determined to be larger only by an appropriate correction amount α than the desired length between the magnetic transition areas a on the in-plane magnetic recording medium 2, and the distance B between the patterns of the ferromagnetic thin films 3 is determined to be smaller only by the correction amount α than the desired length between the magnetic transition areas b on the in-plane magnetic recording medium 2. Accordingly, the desired lengths between the magnetic transition areas a and b can be obtained in the magnetized pattern recorded on the in-plane magnetic recording medium 2, and a desired reproduction waveform 5 can be obtained.

In FIG. 1, the appropriate correction amount α can be estimated, for example, by observing the reproduction waveform in the conventional example shown in FIG. 6, from the difference between the desired length between the magnetic transition areas a and the actual length between the magnetic transition areas $a_1$ or from the difference between the desired length between the magnetic transition areas b and the actual length between the magnetic transition areas $b_1$. The appropriate correction amount α differs depending on the magnetic property or the thickness of the ferromagnetic thin films 3 and the values of the desired lengths between the magnetic transition areas a and b, and further on the magnetic property of the in-plane magnetic recording medium 2 and so forth, so that it is necessary to make an estimate for each embodiment on the basis of experimental experiences as mentioned above.

In one example, the experiment was conducted by using a Co film with saturation magnetic flux density of 1.6 T as the ferromagnetic thin film 3 on the master information carrier 1 under the conditions where the thickness of the ferromagnetic thin film 3 was between 0.2 μm and 1.0 μm, the desired lengths between the magnetic transition areas a, b were between 0.5 μm and 5.0 μm, and the coercivity of the in-plane magnetic recording medium 2 was in the range between 150 kA/m and 300 kA/m. According to the results of this experiment, it is suitable to determine the correction amount α to be in the range between 0.05 μm and 1.0 μm based on the values of the lengths a, b of the magnetic transition areas, and also to determine the values of α/a and α/b to be in the range between 0.01 and 0.8.

With this correction amount α, the quantity of pulse shift in the reproduction waveform by the magnetic head could be suppressed to not more than the permissible limit of the detection window width of the reproduction signal processing circuit.

Figure 22:
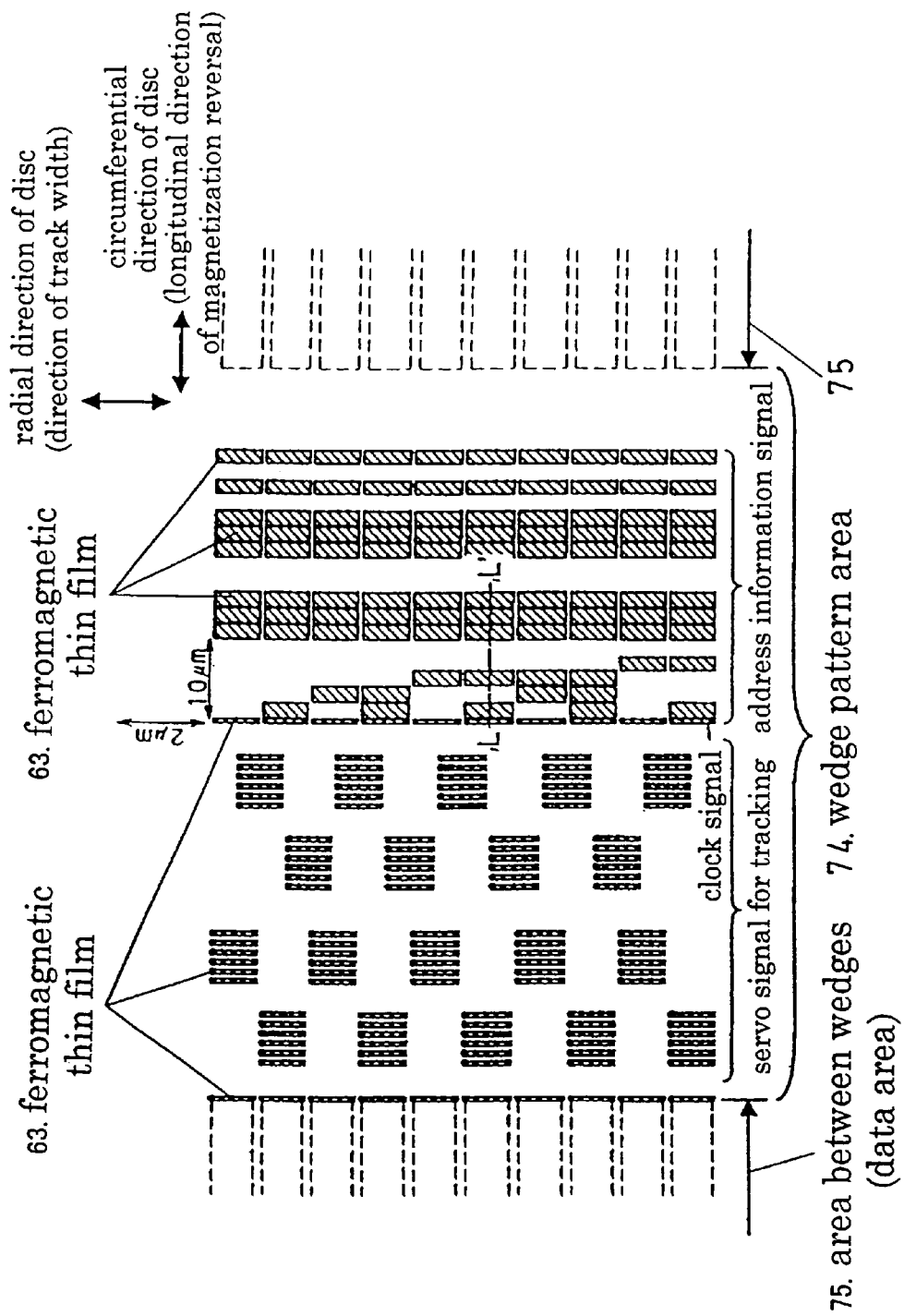
FIG. 22 is an enlarged plan view showing one portion of FIG. 21.

The pattern of the ferromagnetic thin films 3 on the surface of the master information carrier 1 can be manufactured, like the conventional pattern of the ferromagnetic thin films shown in FIG. 22, by using a variety of known lithographic techniques. Now, FIG. 1 shows a configuration example in which the cross-sectional shape of the ferromagnetic thin films 3 is substantially rectangular, but it is not necessarily required to form the rectangular cross-sectional shape as shown in FIG. 1 depending on the characteristics of the applied lithographic technique.

Figure 2:
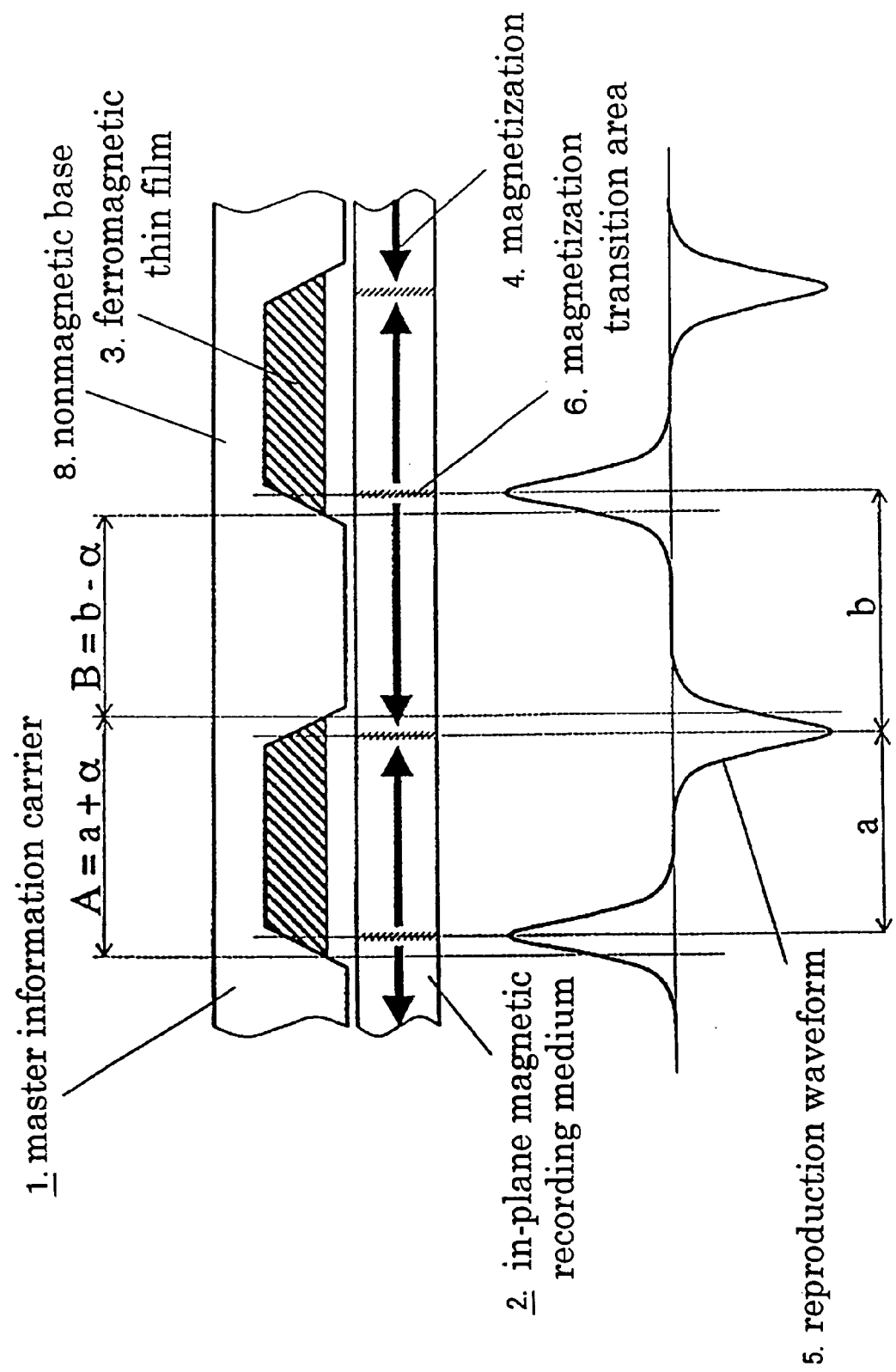
FIG. 2 is an explanatory diagram schematically showing another configuration of a master information carrier according to an embodiment of the present invention and the relationship with a reproduction waveform obtained by reproducing preformat signals recorded with the use of this master information carrier by a magnetic head.
Figure 3:
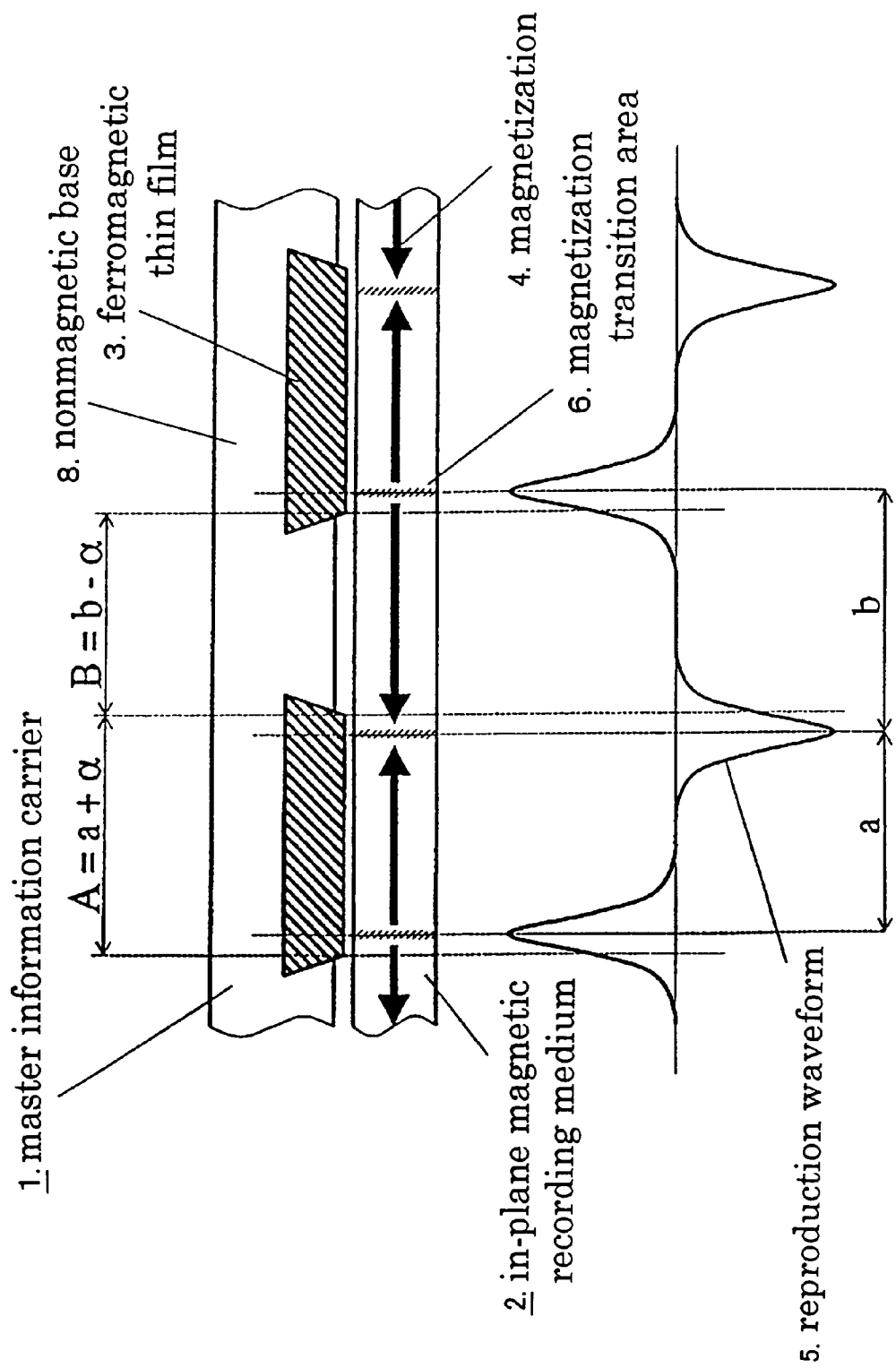
FIG. 3 is an explanatory diagram schematically showing yet another configuration of a master information carrier according to a first embodiment of the present invention and the relationship with a reproduction waveform obtained by reproducing preformat signals recorded with the use of this master information carrier by a magnetic head.

FIG. 2 and FIG. 3 show other configurations of the master information carrier of the present invention provided with the ferromagnetic thin films 3 having the cross-sectional shape that generally is a substantially truncated or frusto shape. With respect to this kind of master information carrier 1, the pattern length A of the outermost surface portion facing the in-plane magnetic recording medium 2 in the ferromagnetic thin films 3 and the length between the patterns B should be controlled.

In other words, as shown in FIG. 2 and FIG. 3, the same effect as that in the configuration shown in FIG. 1 can be obtained by determining the pattern length A of the outermost surface portion facing the in-plane magnetic recording medium 2 in the ferromagnetic thin films 3 having a cross-sectional truncated shape (the length of the master information carrier 1 in the circumferential direction) to be larger only by the appropriate correction amount α than the desired length between the magnetic transition areas a, and on the contrary by determining the distance B between the patterns of the ferromagnetic thin films 3 to be smaller only by the correction amount α than the desired length between the magnetic transition areas b.

Furthermore, FIG. 1 shows a configuration example of the master information carrier 1 in which the surface of the ferromagnetic thin film 3 and the surface of the nonmagnetic base 8 are not stepped but are substantially flat. However, the configuration of the master information carrier according to the present invention is not limited hereto. For example, as shown in FIG. 2, the surface of the ferromagnetic thin film 3 may be recessed by a substantially constant amount relative to the surface of the nonmagnetic base 8. On the contrary, as shown in FIG. 3, the surface of the ferromagnetic thin film 3 may protrude by a substantially constant amount from the surface of the nonmagnetic base 8. Moreover, although a specific illustration is omitted here, it may also be configured such that the ferromagnetic thin films 3 are formed as protrusions on the surface of the nonmagnetic base 8 (See FIG. 24).

However, in the configuration of FIG. 2, if the recessed amount of the surface of the ferromagnetic thin film 3 relative to the nonmagnetic base 8 is too large, there is fear of causing a spacing loss when signals are recorded. This spacing loss changes according to the recording density of signals, but it is generally preferable to determine the above-mentioned recessed amount to be not more than 100 nm when a preformat recording of signals with the lengths between the magnetic transition areas a or b of not more than several μm is performed.

Furthermore, in the configuration of FIG. 3, when the protruding amount of the surface of the ferromagnetic thin film 3 relative to the nonmagnetic base 8 is too large, there is fear of not obtaining sufficient durability for the master information carrier. In view thereof, it is preferable to determine the above-mentioned protruding amount in the configuration of FIG. 3 to be not more than 100 nm.

In addition, in the master information carrier 1 shown in FIG. 1 to FIG. 3, it is not necessarily required to strictly control the correction amount α in order to exactly realize the desired lengths between the magnetic transition areas a and b on the in-plane magnetic recording medium 2. In other words, with the correction amount α, the quantity of pulse shift in the reproduction waveform by the magnetic head should be suppressed to not more than the permissible limit of the detection window width of the reproduction signal processing circuit. In view thereof, it is sufficient to determine the correction amount α so as to control the desired lengths between the magnetic transition areas a and b to be in the range including a certain tolerance in addition to the optimum values to be realized accurately.

Here, in comparing the configurations of FIG. 1 to FIG. 3 with each other, in order to realize the desired lengths between the magnetic transition areas a and b exactly, in the strict sense of the word, it is necessary to increase the correction amount α in the configuration of FIG. 2 versus the configuration of FIG. 1 and to reduce the correction amount α in the configuration of FIG. 3 versus the configuration of FIG. 1. In most cases, however, the difference in the correction amount α between the configurations of FIG. 1 to FIG. 3 is so small as not to be more than the permissible limit of the detection window width of the reproduction signal processing circuit, so that this difference may be ignored.

An example of the embodiment according to the present invention was described above, but the present invention can be applied to various embodiments other than this example. For example, the above-mentioned explanation referred to an example of applying the present invention to a magnetic recording medium to be mounted on a hard disc drive or the like. However, the present invention is not limited hereto and is applicable to magnetic recording media such as a flexible magnetic disc, a magnetic card and a magnetic tape, thereby obtaining the same effect as described above.

Furthermore, with regard to the information signals to be recorded in the magnetic recording medium, preformat signals such as a servo signal for tracking, an address information signal and a reproduction clock signal were used as examples, but the information signals applicable to the present invention also are not limited to the above-mentioned signals.

For example, by using the configuration of the present invention, it is in principle also possible to record various data signals or audio and video signals. In this case, by employing the magnetic recording method for a magnetic recording medium using the master information carrier of the present invention, the software recording medium can be mass-produced by duplication and provided inexpensively.

[Second Embodiment]

In the following, a second embodiment of the present invention will be explained.

Figure 7A:
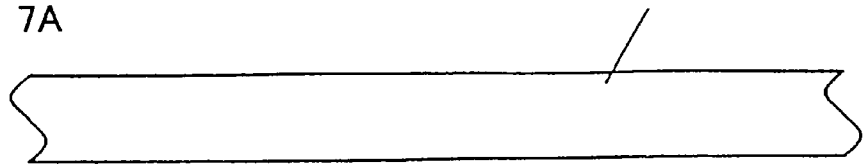
FIG. 7A to FIG. 7C are explanatory diagrams schematically showing one example of performing the step of preformat recording for a vertical magnetic recording medium using a master information carrier according to a second embodiment of the present invention.
Figure 7B:
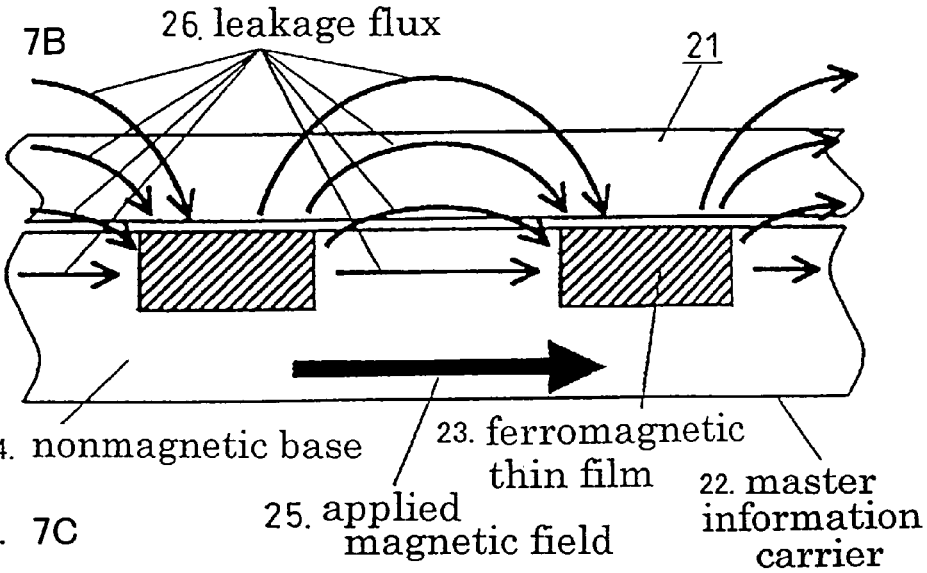
Figure 7C:
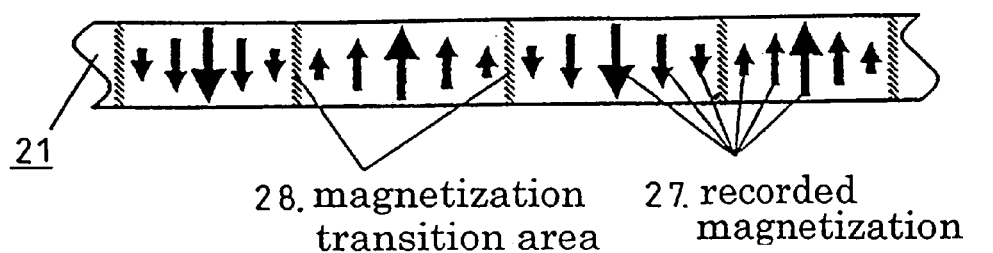

First, the preformat recording step using a master information carrier, which is performed as one of the steps for manufacturing a vertical magnetic recording medium, will be explained briefly by referring to FIG. 7A to FIG. 7C. FIG. 7A to FIG. 7C are cross-sectional views taken in the circumferential direction of a disc of a vertical magnetic recording medium 21, and the lateral direction of the surface also matches the time base direction at the time when a magnetized pattern to be recorded in the vertical magnetic recording medium 21 is reproduced with a magnetic head.

Figure 8:
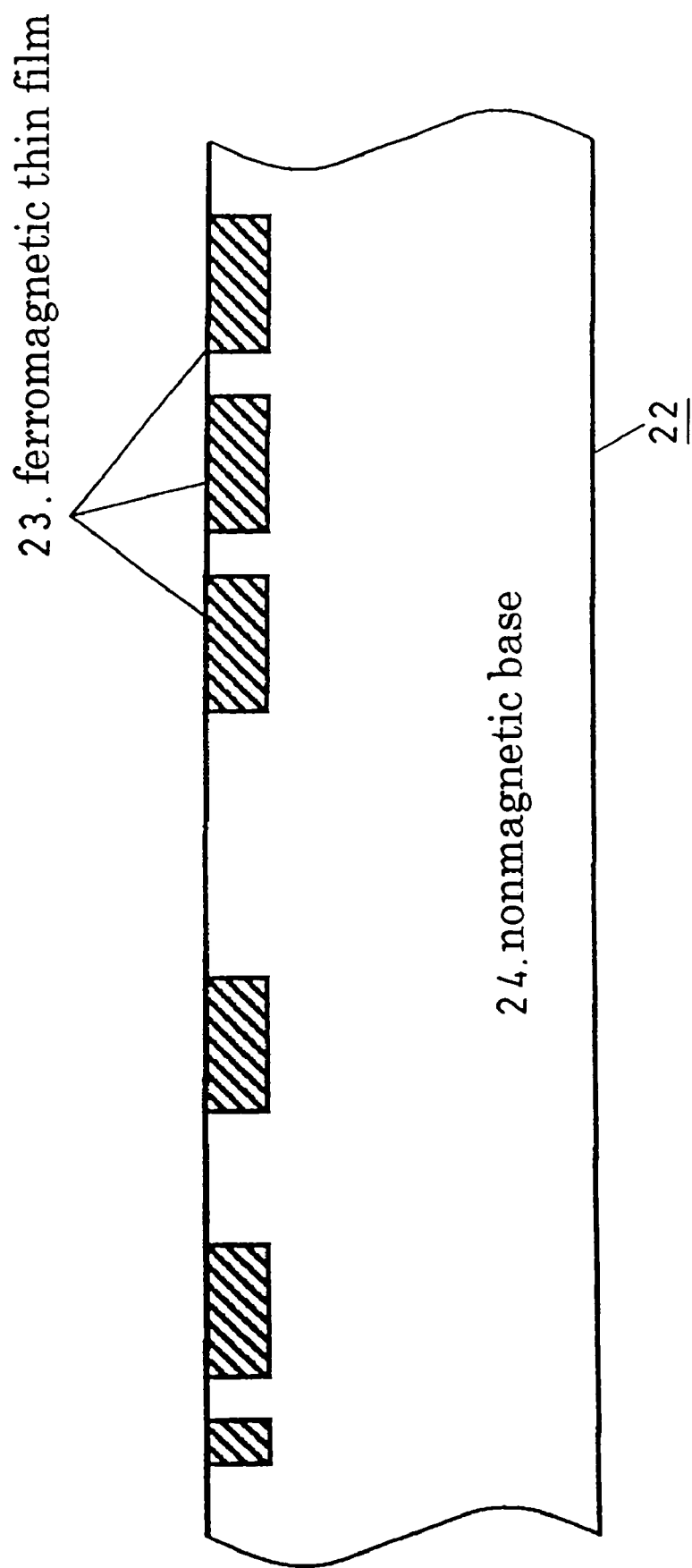
FIG. 8 is a cross-sectional view showing a configuration example of a master information carrier according to the second embodiment.
Figure 9:
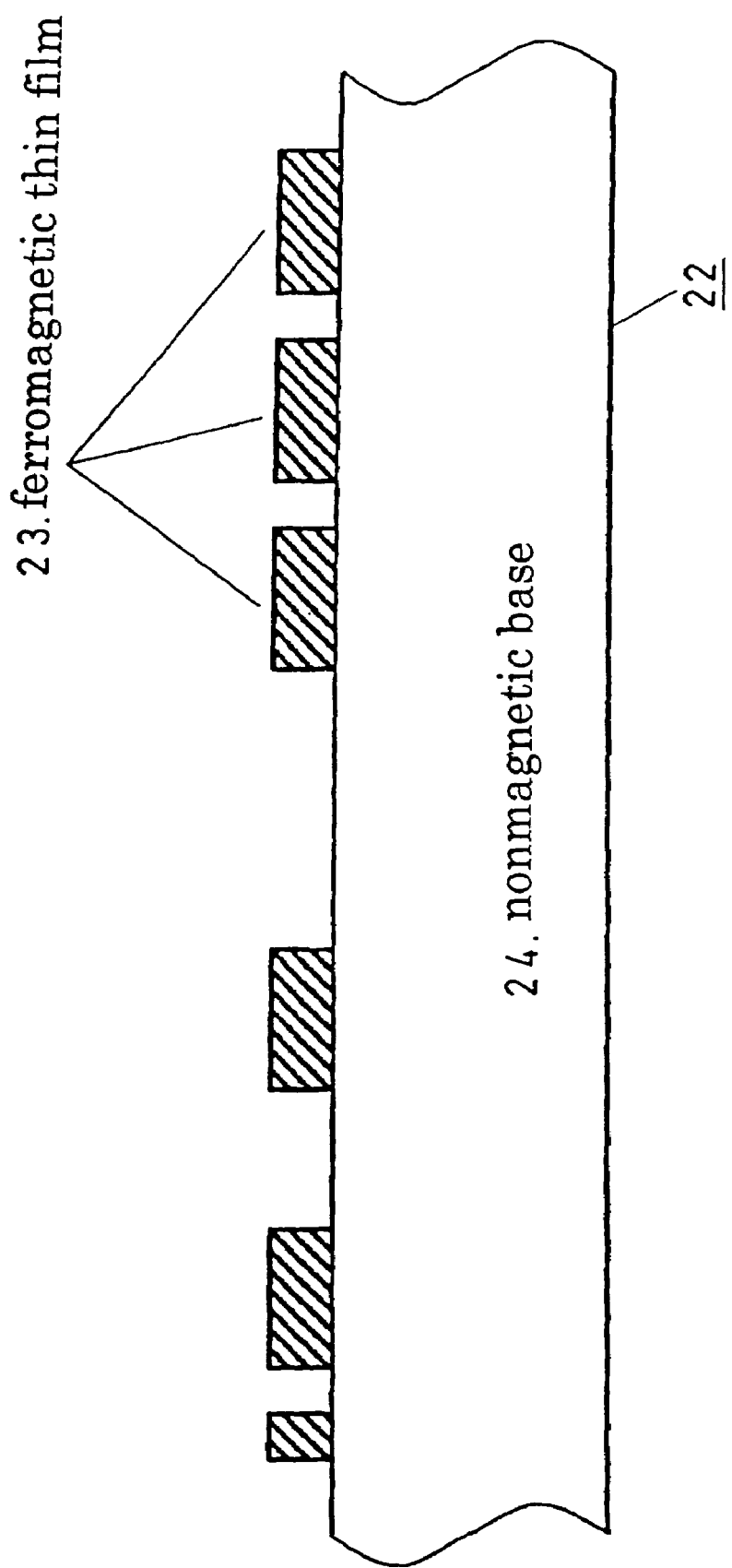
FIG. 9 is a cross-sectional view showing another configuration of a master information carrier according to the second embodiment.

First, as shown in FIG. 7A, the vertical magnetic recording medium 21 in which preformat signals are to be recorded is prepared. Next, as shown in FIG. 7B, the surface of a master information carrier 22 according to the configuration shown in FIG. 8 or FIG. 9 is contacted closely with the surface of the vertical magnetic recording medium 21, and an applied magnetic field 25 is applied in the direction parallel to the film surface of ferromagnetic thin films 32 on the master information carrier 22.

The direction of this applied magnetic field 25 also matches the direction parallel to the film surface of a magnetic layer in the vertical magnetic recording medium 21. In addition, FIG. 7B shows an example of using the master information carrier 22 in which the ferromagnetic thin films 23 are buried in the surface of a nonmagnetic base 24 as shown in FIG. 8, but the master information carrier 22 on which the ferromagnetic thin films 23 are protruding from the surface of the nonmagnetic base 24 as shown in FIG. 9 may be used as well.

As shown in FIG. 7B, by applying the magnetic field 25, leakage flux 26 corresponding to a shape pattern of the ferromagnetic thin films 23 is generated on the surface of the master information carrier 22. This leakage flux 26 substantially contains a large quantity of directional components parallel to the film surface of the ferromagnetic thin film 23, but in the vicinity of the both edges of the ferromagnetic thin film 23, the leakage flux 26 has a relatively large quantity of vertical directional components. Due to this magnetic field with the vertical directional components, recorded magnetization 27 with a pattern corresponding to the shape pattern of the ferromagnetic thin films 23 is recorded in the vertical magnetic recording medium 21 as shown in FIG. 7C.

Figure 10:
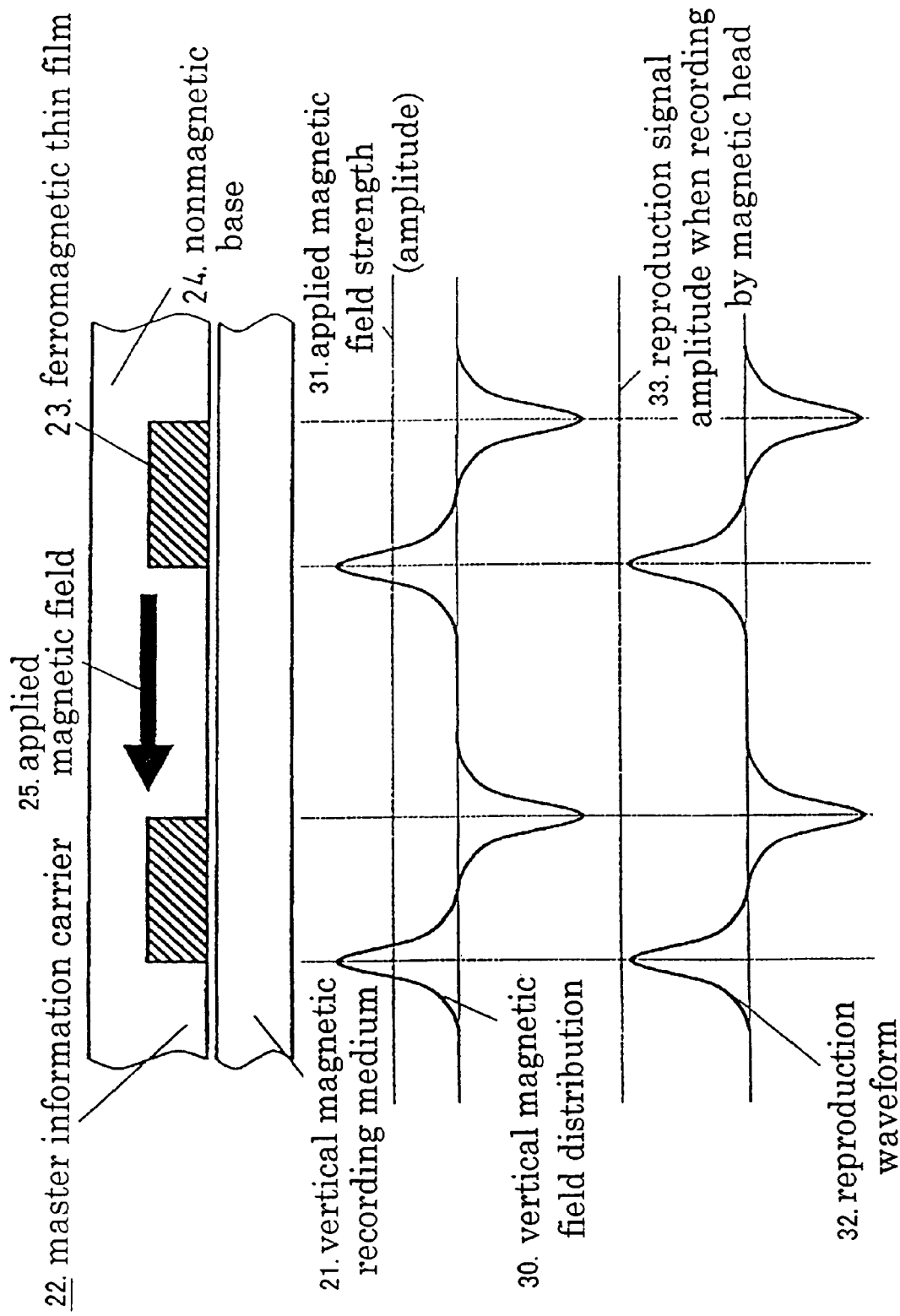
FIG. 10 is an explanatory diagram schematically showing a vertical magnetic field distribution at the time of recording in a vertical magnetic recording medium using a master information carrier according to the second embodiment and the relationship with a reproduction waveform thereof.

Here, a vertical magnetic field distribution contributing to the recording in the present embodiment and a reproduction waveform of the recorded magnetization are shown in FIG. 10. As it is clear by comparing FIG. 10 with FIG. 27, which shows the vertical magnetic field distribution contributing to the recording in the conventional method disclosed in JP10 (1998)-40544A and the reproduction waveform of the recorded magnetization, the magnetic field 65 is applied perpendicular to the ferromagnetic thin films 63 in the conventional method, while the magnetic field 25 is applied in the direction parallel to the film surface of the ferromagnetic thin films 23 in the present embodiment. Accordingly, in the present embodiment, the demagnetizing field inside each pattern of the ferromagnetic thin films 23 is small, and magnetic paths with small magnetic resistance are formed successively in the in-plane of the master information carrier 22. As a result, in the present embodiment, as shown in FIG. 10, an extremely large volume of leakage flux 26 can be obtained compared to the leakage flux 66 obtained by the conventional method shown in FIG. 27.

As already described, this leakage flux 26 substantially contains a large quantity of directional components parallel to the film surface of the ferromagnetic thin films 23, but a sufficiently large volume of vertical directional components can be obtained in the vicinity of the both edges of the ferromagnetic thin film 23 compared to the volume 31 of the applied magnetic field 25 (the volume of this applied magnetic field shown in FIG. 10 is the volume of directional components parallel to the film surface of the ferromagnetic thin films 23). Therefore, the recorded magnetization in the vertical magnetic recording medium 21 also is large in correspondence with the value of the residual magnetization intrinsic in the vertical magnetic recording medium 21, and also with regard to a reproduction waveform 32 reproduced by this recorded magnetized pattern, an amplitude almost as large as a reproduction signal amplitude 33 reproduced from the magnetized pattern recorded by the conventional magnetic head can be obtained.

Figure 27:
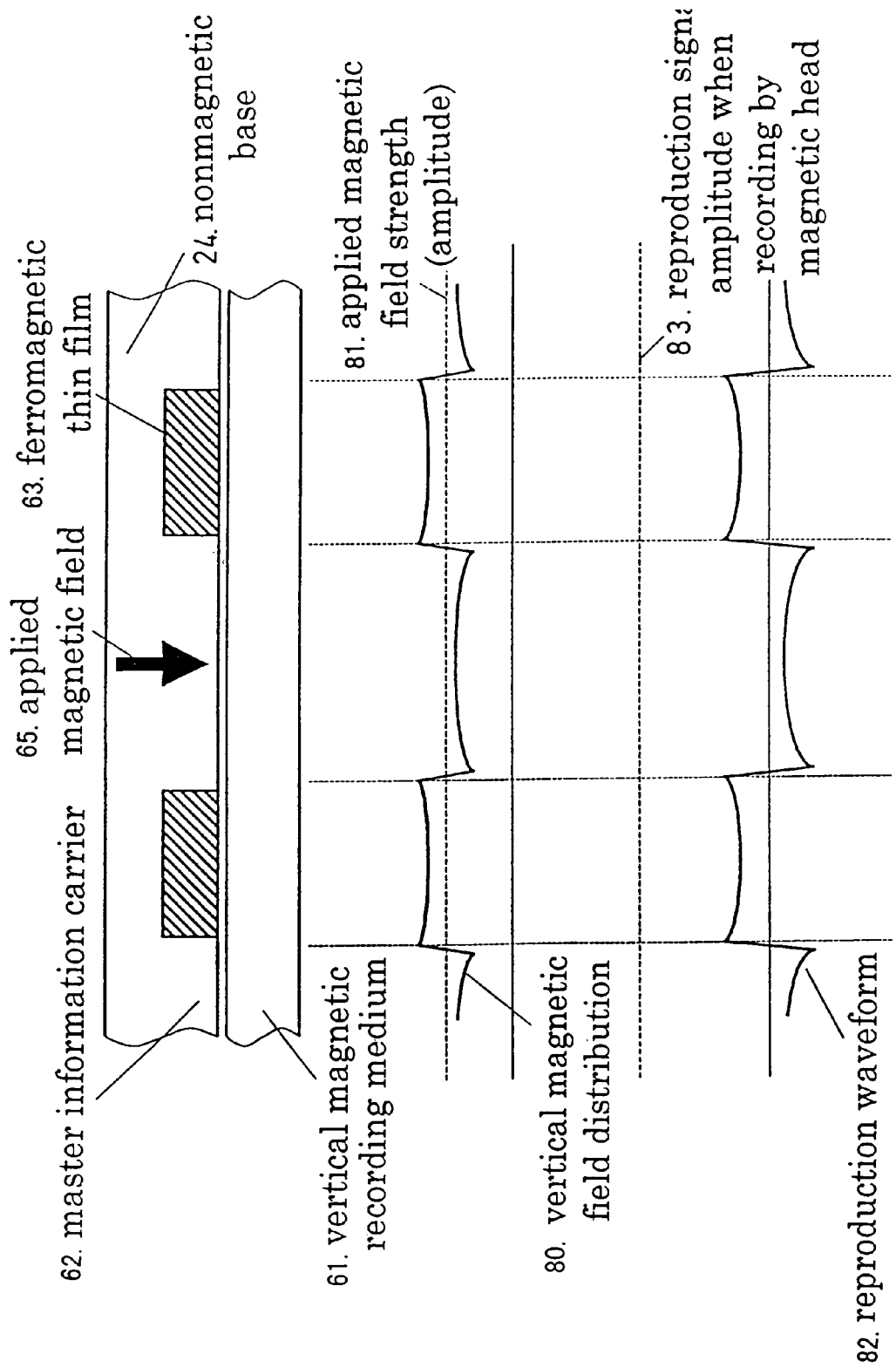
FIG. 27 is an explanatory diagram schematically showing a vertical magnetic field distribution at the time of recording in a vertical magnetic recording medium by using a conventional manufacturing method and the relationship with a reproduction waveform thereof.

It should be noted here that the vertical magnetic field distribution in the magnetic recording method of the present embodiment differs from that in the conventional method shown in FIG. 27 in that this vertical magnetic field distribution shows a large magnetic field amplitude with reversed polarities to each other in the vicinity of the both edges of the ferromagnetic thin film 23. In other words, with the conventional method shown in FIG. 27, the vertical magnetic field distribution corresponding to the pattern shape of the ferromagnetic thin films can be obtained, but this merely was an overall amplitude change in the same polarity. Therefore, in order to record a recorded magnetized pattern in which magnetization areas with reversed polarities to each other are arranged alternately via a magnetic transition area, and thus to obtain a larger reproduction signal amplitude, it was necessary to provide initial magnetization by erasing magnetization through application of a d.c. magnetic field in one direction.

On the other hand, according to the magnetic recording method of the present embodiment, by applying the magnetic field 25, it is possible to obtain a vertical magnetic field distribution that has a magnetic field amplitude with reversed polarities to each other in the vicinity of both edges of each pattern of the ferromagnetic thin films 23 and also with a large volume. Therefore, without performing the initialization with application of a d.c. magnetic field, a recorded magnetized pattern can be formed in which magnetization areas with reversed polarities to each other are arranged alternately via a magnetic transition area, and thus a larger reproduction signal amplitude can be obtained. In other words, the magnetic recording method of the present embodiment does not necessarily require erasing the magnetization by applying a d.c. magnetic field in one direction, so that the problem in the conventional method does not occur in that it is difficult to obtain the state of substantially stable and uniform magnetization by erasing the magnetization by applying a d.c. magnetic field in one direction in a vertical magnetic recording medium.

Figure 11:
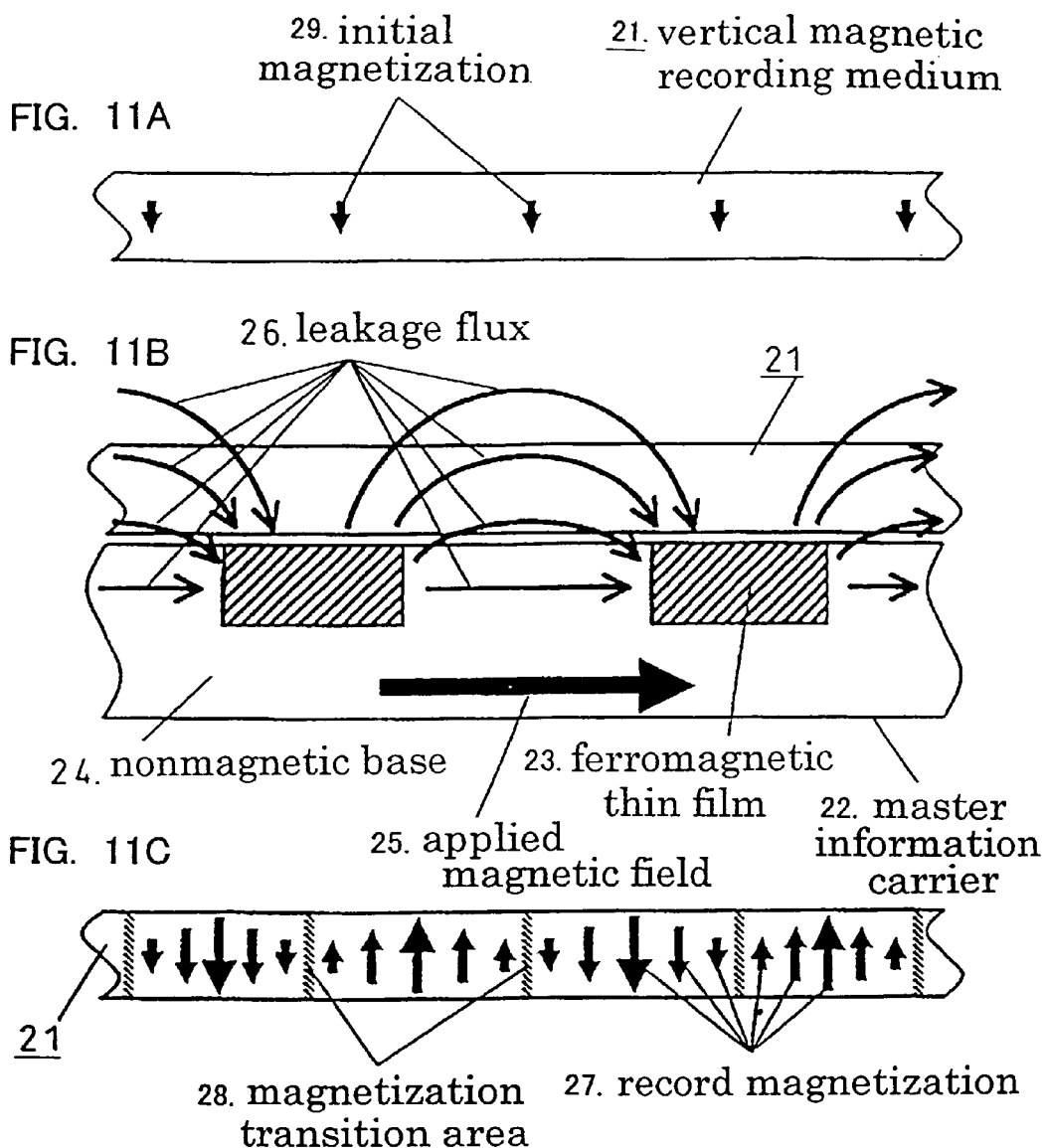
FIG. 11A to FIG. 11C are explanatory diagrams schematically showing another example of performing the step of preformat recording for a vertical magnetic recording medium using a master information carrier according to a second embodiment of the present invention.

In addition, also in the magnetic recording method of the present embodiment, it is possible to erase the magnetization of the vertical magnetic recording medium 21 in advance by applying a d.c. magnetic field in one direction and to provide initial magnetization as shown in FIG. 11A. Furthermore, also by applying a magnetic field alternately in opposite directions or through application of a thermomagnetization method or the like, the magnetization of the vertical magnetic recording medium 21 can be erased to a neutral point in advance. For example, when a preformat recording is performed for the second time by using the magnetic recording method of the present embodiment for a vertical magnetic recording medium in which certain magnetization signals are already recorded, for the purpose of preventing unnecessary magnetization signals from remaining, it is effective to erase magnetization in advance by applying a magnetic field in one direction or alternately in opposite directions or through application of a thermomagnetization method. In any case, the recorded magnetized pattern that can be obtained in consequence does not differ much from that recorded by the process shown in FIG. 7A to FIG. 7C, and reproduction signals of excellent quality can be obtained.

Furthermore, the reproduction waveform reproduced from the magnetized pattern recorded by the magnetic recording method of the present embodiment does not have a rectangular shape peculiar to vertical magnetic recording such as the reproduction waveform reproduced from the magnetized pattern recorded by the conventional method shown in FIG. 27 or the reproduction waveform reproduced from the magnetized pattern recorded by a magnetic head, but instead has the same single-peak-shape as the reproduction waveform of longitudinal magnetic recording (in-plane magnetic recording). For detecting the rectangular waveform peculiar to the vertical magnetic recording with a signal processing circuit used for a recording reproduction device of the present in-plane magnetic recording medium, this rectangular shape needs to be differentiated and converted to the same single-peak waveform as that of longitudinal magnetic recording.

However, the waveform obtained from the magnetized pattern recorded by the magnetic recording method of the present embodiment is the same single-peak waveform as that of longitudinal magnetic recording from the beginning, so that such a differentiation process is unnecessary. Therefore, a magnetic recording reproduction device to be mounted with a magnetic disc in which the preformat recording is performed by the magnetic recording method of the present embodiment also can be advantageous in view of the cost, due to the fact that an extra differentiation processing circuit is no longer needed in the detection system of servo signals.

In order to perform a recording in a vertical magnetic recording medium having larger coercivity by the magnetic recording method of the present embodiment, a larger vertical magnetic field is needed. In this case, the ferromagnetic thin films constructing the shape patterns corresponding to the preformat signals in the master information carrier are required to have a large saturation magnetic flux density. According to the examinations conducted by the present inventors, it is preferable that the ferromagnetic thin films have a saturation magnetic flux density of at least 0.8 T, and not less than 1.0 T is more preferable.

Furthermore, the ferromagnetic thin films 23 are required to be magnetized quickly by the applied magnetic field 25 and also to exhibit the effect of shielding the magnetic flux in the vicinity thereof. In view of the foregoing, it is preferable that the ferromagnetic thin films 23 have a relatively high magnetic permeability, and particularly a relative permeability of not less than 100 is preferable.

Furthermore, for achieving excellent recording performance by the magnetic recording method of the present embodiment, it is necessary that the demagnetizing field in the in-plane direction of the film inside each pattern of the ferromagnetic thin films 23 is small, and that magnetic paths with small magnetic resistance are formed successively in the in-plane of the master information carrier 22. Therefore, contrary to the conventional method shown in FIG. 27, it is not preferable to increase the thickness of the ferromagnetic thin films in ratio to the pattern length thereof.

According to the examinations conducted by the present inventors, it is preferable that the thickness of the ferromagnetic thin films 23 is about as large as or not larger than the pattern length of the ferromagnetic thin films 23 in the circumferential direction of the master information carrier 22. The pattern length of this ferromagnetic thin film 23 is formed so as to substantially match the length of magnetization reversal in the magnetized pattern to be recorded (that is, the distance between two magnetic transition areas adjacent to each other). Therefore, the minimum value of the pattern length of the ferromagnetic thin films existing on one master information carrier 22 substantially matches a bit length in the case of a digital signal and half of the shortest recording wavelength in the case of an analog signal. Thus, the thickness of the ferromagnetic thin films 23 may be determined to be not more than the bit length of the digital information signal to be recorded in the vertical magnetic recording medium 21 or not more than half of the shortest recording wavelength of the analog information signal to be recorded in the vertical magnetic recording medium 21.

Next, the magnetic recording method of the present embodiment will be explained more in detail.

Figure 12:
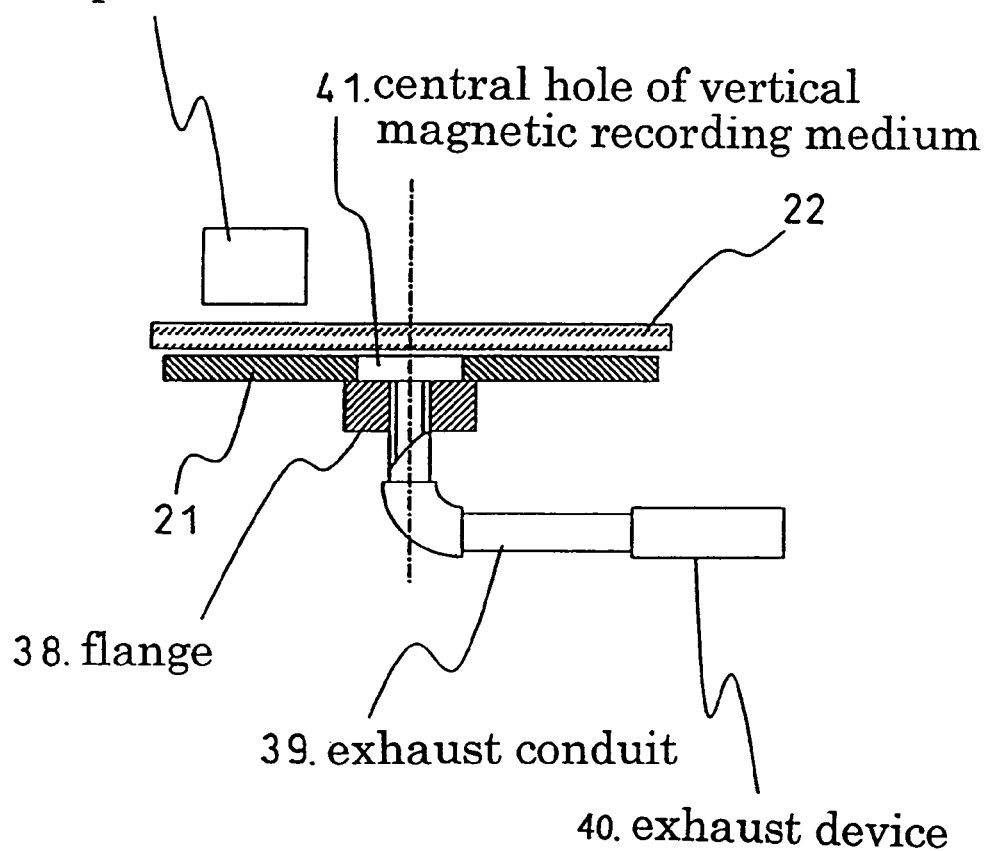
FIG. 12 is a cross-sectional view showing the configuration of a magnetic recording device used for performing a preformat recording for a vertical magnetic recording medium using a master information carrier according to the second embodiment.

FIG. 12 is a cross-sectional view showing one example of a schematic configuration of a magnetic recording device used for the magnetic recording method of the present embodiment. In this magnetic recording device, first, the master information carrier 22 is positioned on the surface of the vertical magnetic recording medium 21 arranged on a flange 38. Next, air present between the vertical magnetic recording medium 21 and the master information carrier 22 is exhausted from a central hole 41 of the vertical magnetic recording medium by an exhaust device 40 connected to the flange 38 via an exhaust duct 39. Thus, due to the decompression state achieved between the vertical magnetic recording medium 21 and the master information carrier 22, both of them are contacted closely. In addition, 37 shown in FIG. 12 is a magnetic transcription head for providing the master information carrier 22 with the applied magnetic field 25.

The magnetic transcription head 37, which is arranged near the back face of the master information carrier 22, is configured so as to perform a relative movement against the master information carrier 22 while maintaining a constant distance from the back face of the master information carrier 22. Due to this configuration, the applied magnetic field required for the transcription recording can be provided over necessary areas of the master information carrier 22.

Figure 13:
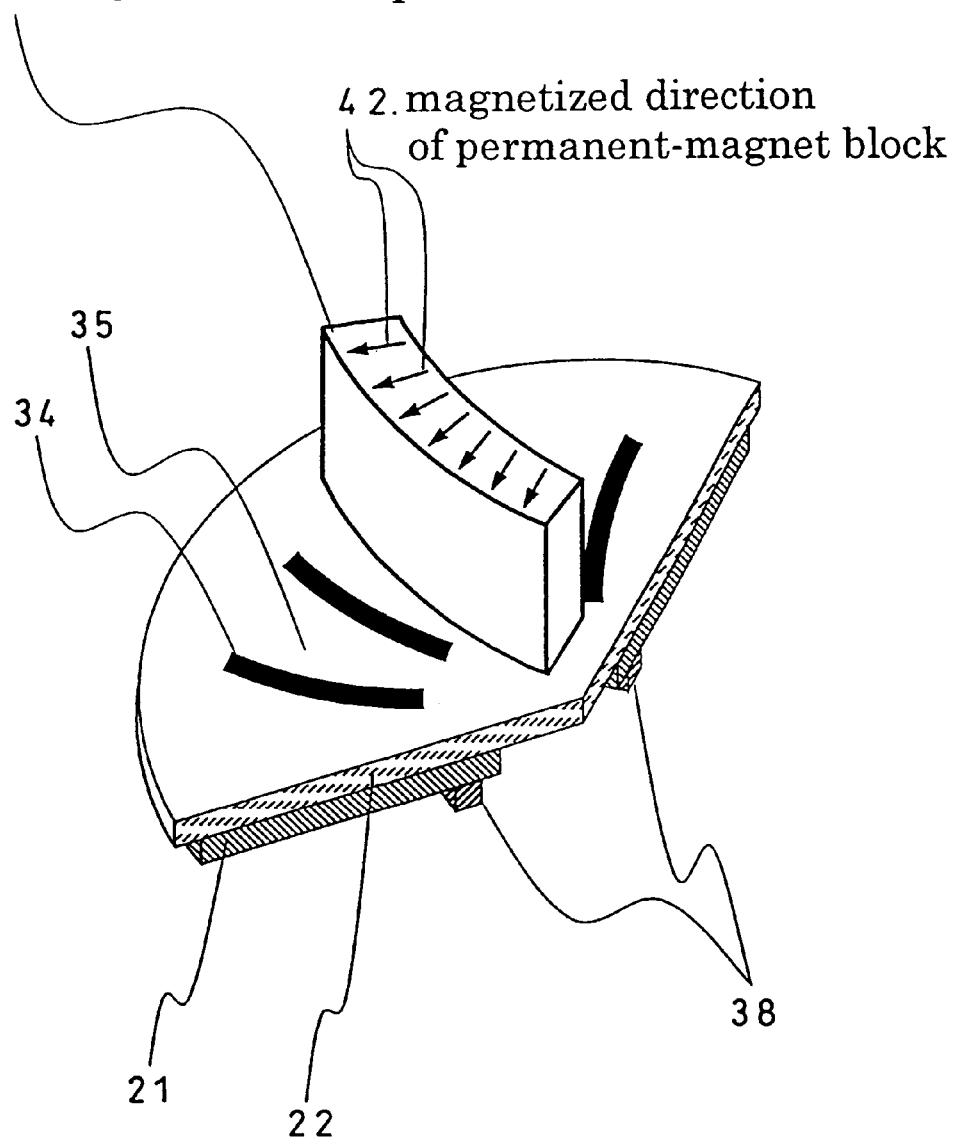
FIG. 13 is an explanatory diagram showing a configuration example of a magnetic transcription head installed in the above-mentioned magnetic recording device.

An enlarged view of a configuration example near the magnetic transcription head 37 in the magnetic recording device shown in FIG. 12 is shown in FIG. 13. FIG. 13 shows the configuration example in which a magnetic transcription head 37a is made of a permanent-magnet block. The magnetic transcription head 37a made of a permanent-magnet block is magnetized in the direction parallel to the side facing the master information carrier 22 as shown by arrow 42 so as to provide the ferromagnetic thin films 23 of the master information carrier 22 with the applied magnetic field 25 in the in-plane direction of the film. In the configuration of FIG. 13, by rotating the magnetic transcription head 37a around the disc center of the vertical magnetic recording medium 21, the applied magnetic field needed for the transcription recording can be provided over all the wedge pattern areas 34. Here, the wedge pattern area 34 is an area where the pattern of the ferromagnetic thin films 23 is formed.

Figure 14:
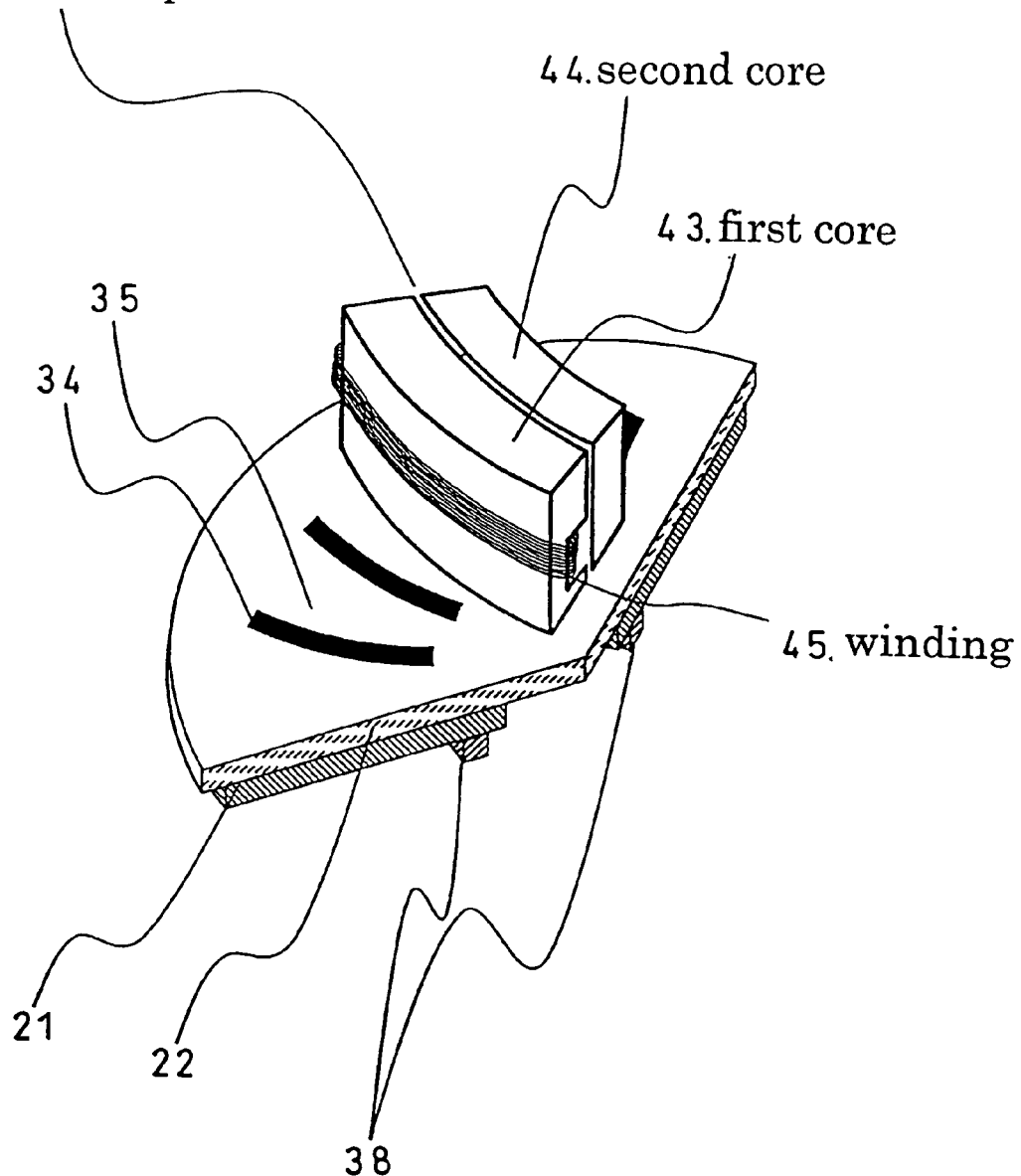
FIG. 14 is an explanatory diagram showing another configuration of a magnetic transcription head installed in the above-mentioned magnetic recording device

An enlarged view of another configuration example near the magnetic transcription head 37 in the magnetic recording device shown in FIG. 12 is shown in FIG. 14. FIG. 14 shows the configuration example in which a magnetic transcription head 37b is formed as a ring type with a first magnetic core 43 and a second magnetic core 44 made of a ferromagnetic material, and also in which the first magnetic core 43 is an electromagnet equipped with a coil winding 45. The magnetic transcription head 37b has a gap between the first magnetic core 43 and the second magnetic core 44 so as to provide the surface facing the master information carrier 22 with the applied magnetic field 25 in the film in-plane direction of the ferromagnetic thin films 23 on the master information carrier 22. Also in the configuration of FIG. 14, by rotating the magnetic transcription head 37b around the disc center of the vertical magnetic recording medium 21, the applied magnetic field needed for the transcription recording can be provided over all the wedge pattern areas 34.

In the following, the operating conditions and so forth of the magnetic transcription head in the magnetic recording device at the time when the magnetic recording method of the present embodiment is performed will be explained by referring to some specific embodiments.

First, the operation of a magnetic transcription head in a magnetic recording device provided with the magnetic transcription head 37a of a permanent magnet block type as shown in FIG. 13 will be explained. FIG. 15B and FIG. 15C, FIG. 16B and FIG. 16C, and FIG. 17B and FIG. 17C show the relative position relationship between the vertical magnetic recording medium, the master information carrier and the magnetic transcription head at the time when a preformat recording is performed for the vertical magnetic recording medium using the magnetic recording device and are cross-sectional views taken on broken line MM' indicated on the surface of the master information carriers 22 shown in FIG. 15A, FIG. 16A and FIG. 17A.

When the preformat recording is performed, as shown in FIG. 17B, the magnetic transcription head 37a is shifted relative to the master information carrier 22 toward the direction shown by an arrow 46 while maintaining a constant distance from the back face of the master information carrier 22. At the time when the applied magnetic field needed for the transcription recording is provided over all the wedge pattern areas 34 of the master information carrier 22, the preformat recording is completed, and the magnetic transcription head 37a is moved relatively far away from the master information carrier.

FIG. 17C shows the state of separating the master information carrier 22 far away by shifting the magnetic transcription head 37a in the direction perpendicular to the surface of the master information carrier 22 (in the direction shown by an arrow 47 in FIG. 17C). At this time, it is not preferable to perform the operation of separating the magnetic transcription head 37a in a position in which the magnetic transcription head 37a faces the wedge pattern 34 of the master information carrier 22. This is because, depending on the distribution of the leakage magnetic flux 26 from the magnetic transcription head 37a, the ferromagnetic thin films 23 inside the wedge pattern area 34 may be magnetized in the direction perpendicular to the film surface, and as a result, the recorded magnetized pattern in the vertical magnetic recording medium 21 may be erased or demagnetized.

To prevent the above-described phenomenon from occurring and to complete the preformat recording appropriately, it is preferable to perform the operation of separating the magnetic transcription head 37a from the master information carrier 22 in a position in which the magnetic transcription head 37a faces an area between wedges 35 where the pattern of the ferromagnetic thin films 23 is not formed. Such a preferable embodiment is shown in FIG. 15C. In FIG. 15C, the separating operation is performed in the position where the magnetic transcription head 37a faces the area between wedges 35 where the pattern of the ferromagnetic thin films 23 is not formed by shifting the magnetic transcription head 37a in the direction perpendicular to the surface of the master information carrier 22 (in the direction shown by the arrow 47), so that the recorded magnetized pattern is neither erased nor demagnetized as described above.

Depending on the configuration of a magnetic transcription device, particularly on the arrangement of machine parts included in this device, it is sometimes difficult to perform the separating operation by shifting the magnetic transcription head 37a in the direction perpendicular to the surface of the master information carrier 22. In such a case, as long as the operation of separating the magnetic transcription head 37a is performed in the position in which the magnetic transcription head 37a faces the area between wedges 35 where the pattern of the ferromagnetic thin films 23 is not formed, it is also possible to perform the separating operation by shifting the magnetic transcription head 37a in the direction parallel to the surface of the master information carrier 22 as illustrated in FIG. 16C (in the direction 47 shown in FIG. 16C).

Figure 16B:
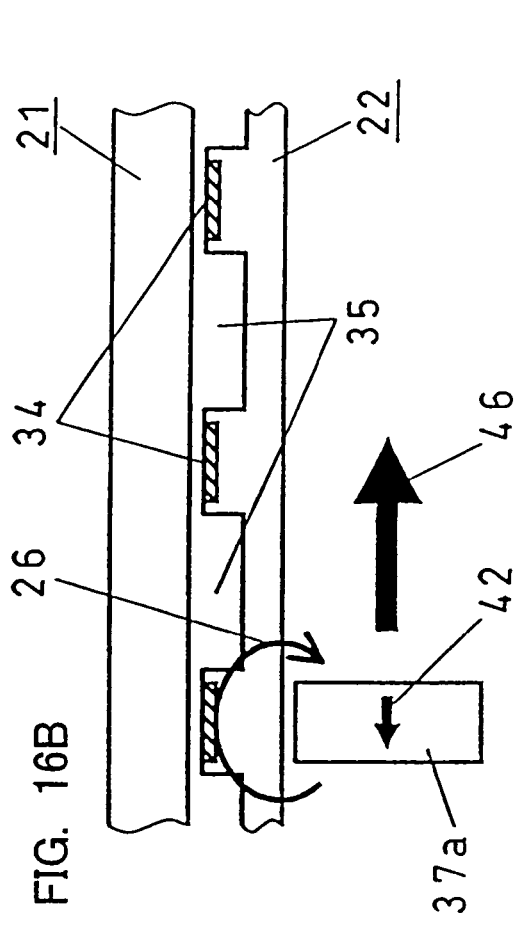
FIG. 16B and FIG. 16C are explanatory diagrams schematically showing another example of operating a magnetic transcription head at the time of performing a preformat recording using this master information carrier.
Figure 16C:
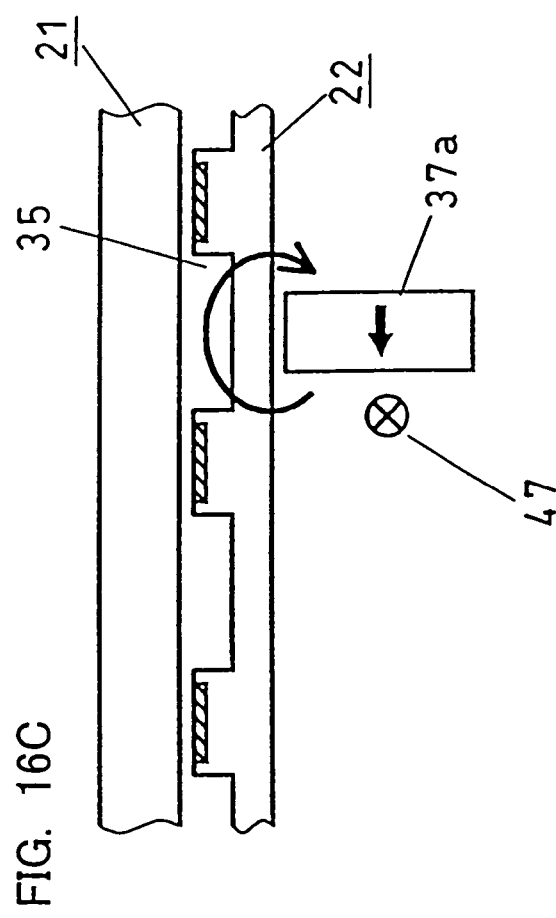
Figure 16A:
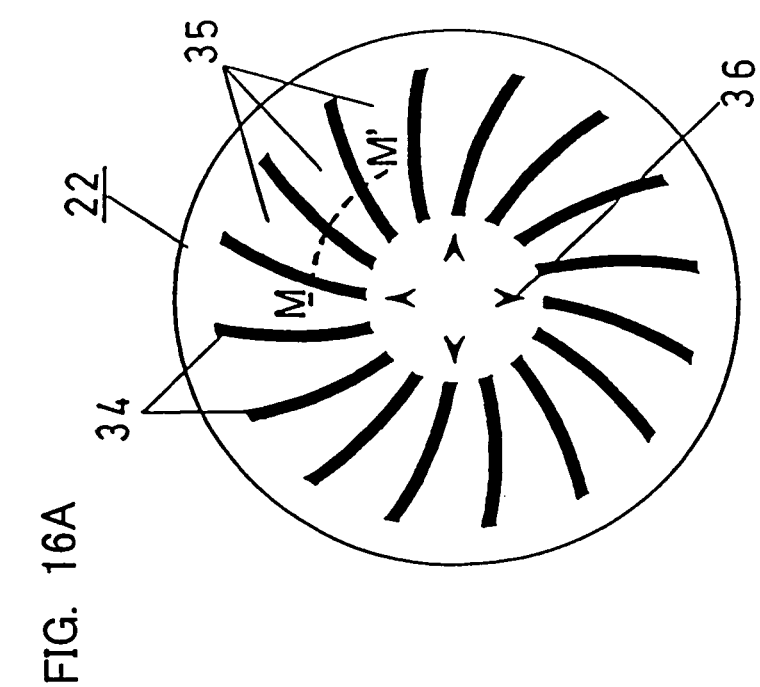
FIG. 16A is a plan view showing the configuration of a master information carrier according to the second embodiment.

In the master information carrier 22 shown in FIG. 16B and FIG. 16C, the areas between wedges 35, where the shape pattern of the ferromagnetic thin films is not formed, are formed in a concave shape adjacent the wedge pattern areas 34. This works as an air channel for evacuating the air between the master information carrier and the magnetic recording medium. As already explained by referring to FIG. 12, in the magnetic recording device used for performing the magnetic recording method of the present embodiment, air present between the vertical magnetic recording medium 21 and the master information carrier 22 is exhausted from the central hole 41 of the vertical recording medium 21 by the exhaust device 40, and due to the decompression state achieved between them, both of them are contacted closely. By forming the area between wedges 35 into a concave shape adjacent the wedge pattern area 34 as shown in FIG. 16B etc., exhaust paths of air between the vertical magnetic recording medium 21 and the master information carrier 22 are secured sufficiently. As a result, the decompression state between the vertical magnetic recording medium 21 and the master information carrier 22 can be achieved more completely and easily.

In addition, whether to perform the operation of separating the magnetic transcription head 37a from the master information carrier 22 in the direction perpendicular to the surface of the master information carrier 22 as shown in FIG. 15C or in the parallel direction thereto as shown in FIG. 16C, is not dependent on whether the area between wedges 35 is formed in a concave shape or not. According to the configuration of the magnetic recording device, either combination can be selected.

Figures 18A, 18B, 18C:
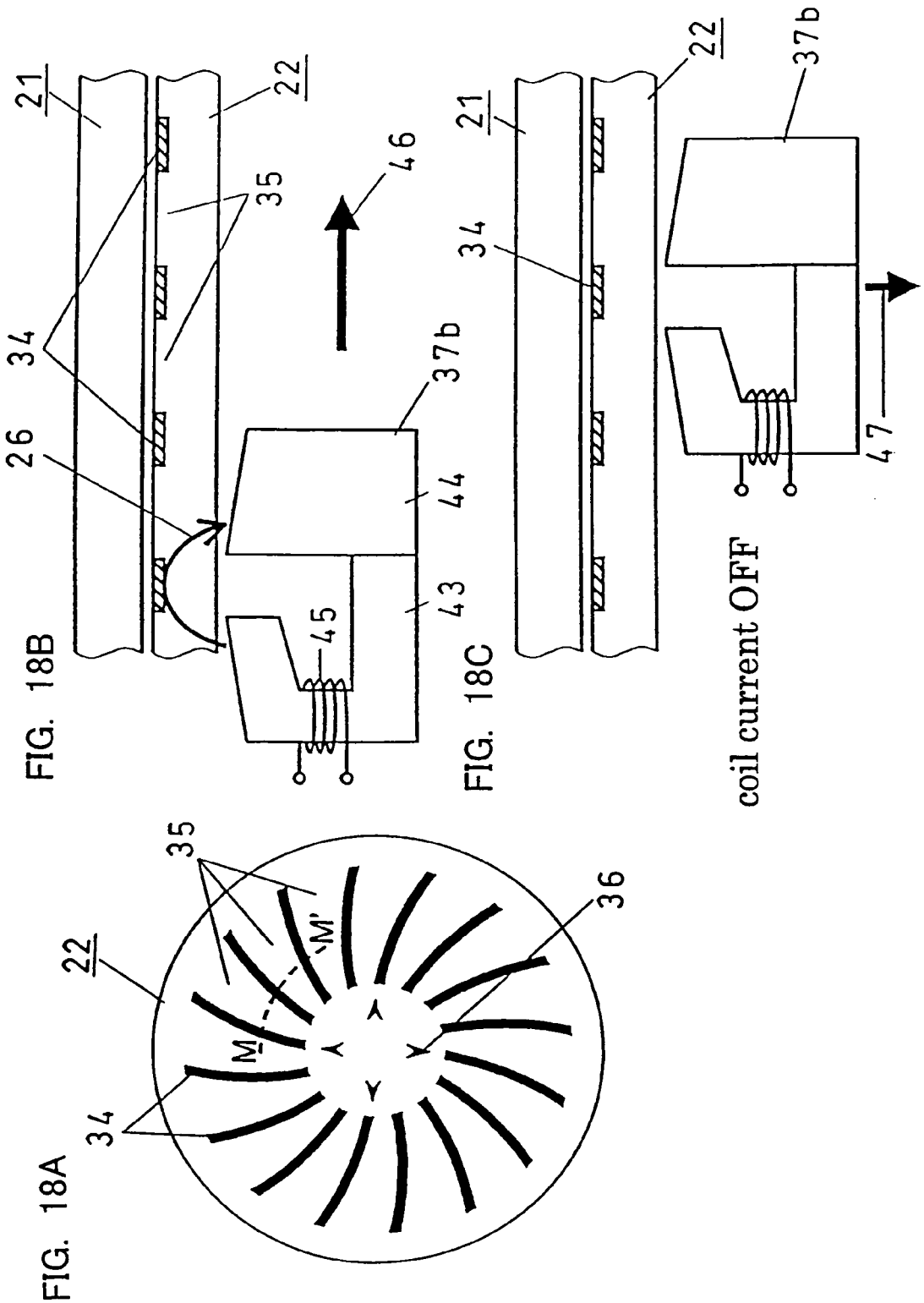
FIG. 18A is a plan view showing the configuration of a master information carrier according to the second embodiment.
FIG. 18B and FIG. 18C are explanatory diagrams schematically showing yet another example of operating a magnetic transcription head at the time of performing a preformat recording using this master information carrier.

Next, the operation of the magnetic transcription head 37b at the time when a preformat recording is performed for the vertical magnetic recording medium 21 by using the magnetic recording device provided with the ring type magnetic transcription head 37b shown in FIG. 14 will be explained by referring to FIG. 18A to FIG. 18C. FIG. 18B and FIG. 18C are cross-sectional views taken on broken line MM' indicated on the surface of the master information carriers 22 shown in FIG. 18A.

When the preformat recording is performed, as shown in FIG. 18B, the magnetic transcription head 37b is shifted relative to the master information carrier 22 toward the direction shown by the arrow 46 while maintaining a constant distance from the back face of the master information carrier 22. In this process, the coil winding 45 is provided with coil current in the magnetic transcription head 37b so as to give an appropriate applied magnetic field to the master information carrier 22. At the time when the applied magnetic field needed for the transcription recording is provided over all the wedge pattern areas 34, the preformat recording is completed, and the, magnetic transcription head 37b is moved relatively far away from the master information carrier 22.

In the case of this magnetic transcription head 37b, the coil current can be switched off to stop providing the master information carrier 22 with the applied magnetic field. Therefore, if the coil current is switched off prior to the operation of separating the magnetic transcription head 37b from the master information carrier 22, as shown in FIG. 18C, even if the separating operation is performed in a position in which the magnetic transcription head 37b faces the wedge pattern area 34 on the master information carrier 22, there is no fear that the magnetized pattern recorded on the vertical magnetic recording medium 21 will be erased or demagnetized, and excellent results can be obtained.

FIG. 18C shows the state of separating the magnetic transcription head 37b in the direction perpendicular to the surface of the master information carrier 22, but excellent results can be obtained also in the case of separating it in the direction parallel to the surface.

Figures 19A, 19B, 19C:
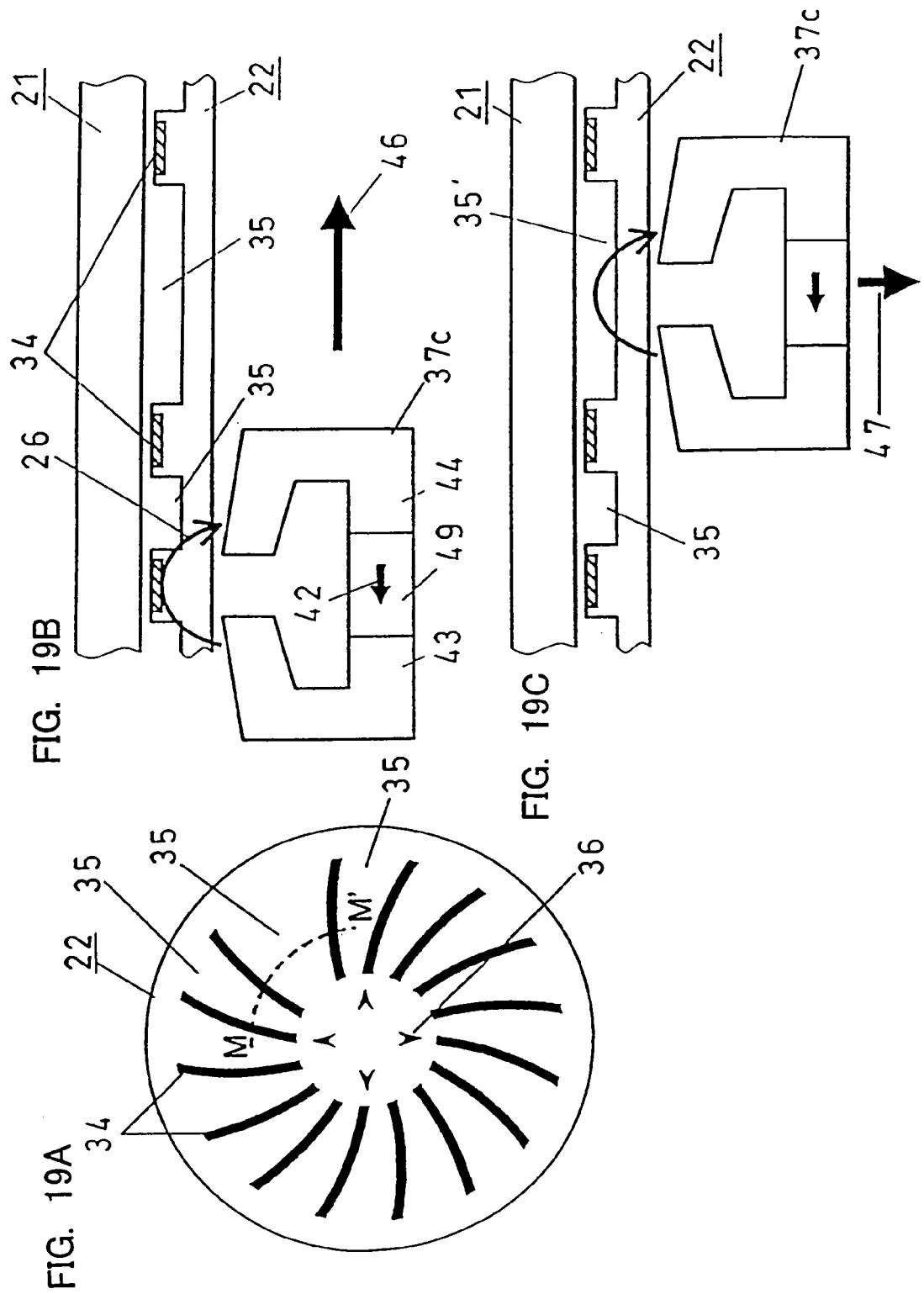
FIG. 19A is a plan view showing the configuration of a master information carrier according to the second embodiment.
FIG. 19B and FIG. 19C are explanatory diagrams schematically showing yet another example of operating a magnetic transcription head at the time of performing a preformat recording using this master information carrier.
Figure 21:
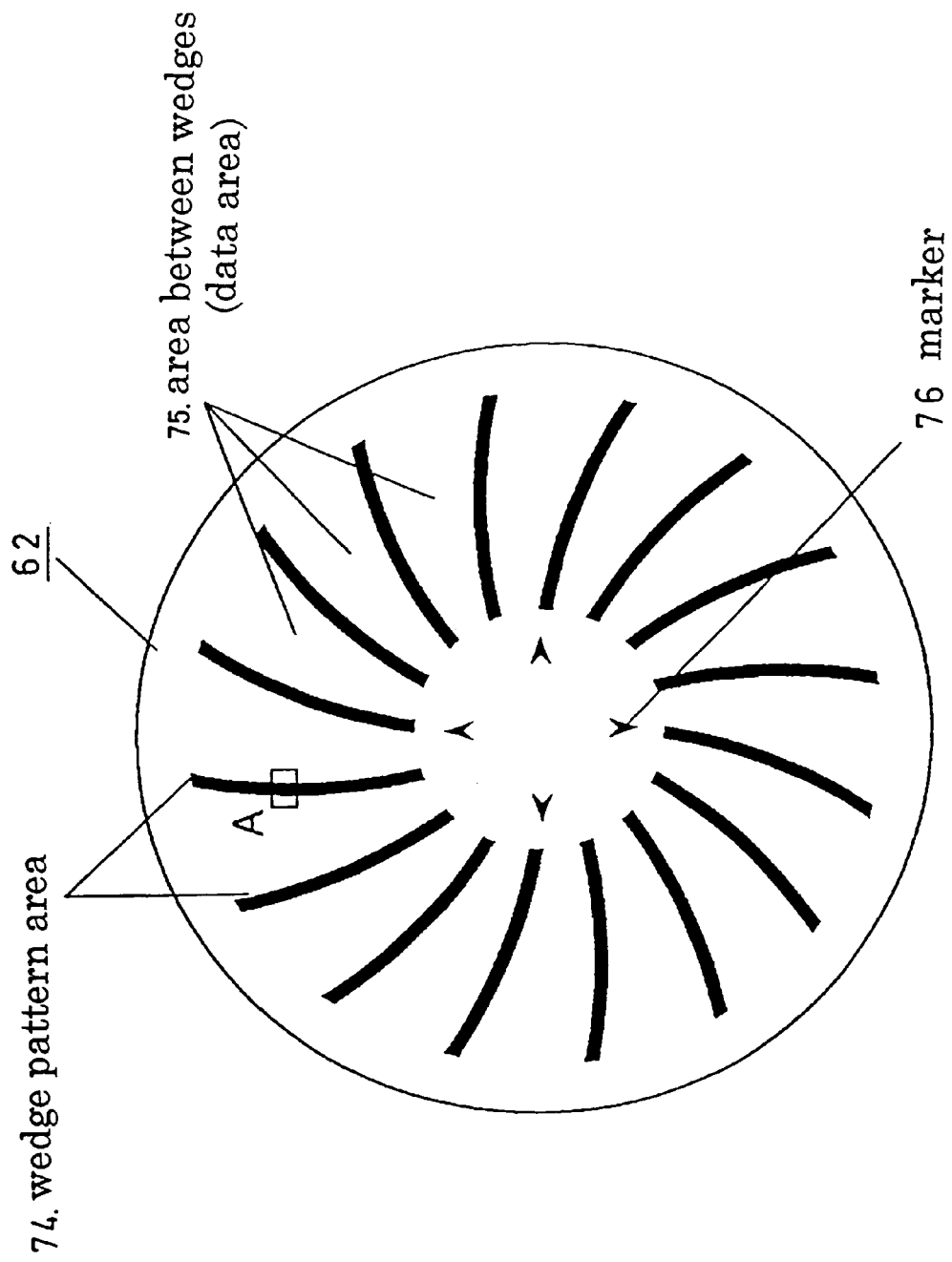
FIG. 21 is a plan view showing the configuration of a conventional master information carrier.

Next, yet another example of performing the magnetic recording method according to the present embodiment will be shown by referring to FIG. 19A to FIG. 19C. FIG. 19B and FIG. 19C are cross-sectional views taken on broken line MM' indicated on the surface of the master information carrier 22 shown in FIG. 19A.

A magnetic transcription head 37c shown in FIG. 19B is also a ring type as the magnetic transcription head 37b shown in FIG. 18B etc., but while the magnetic transcription head 37b is equipped with the coil winding 45, the configuration of this magnetic transcription head 37c differs in that the first magnetic core 43 and the second magnetic core 44 are opposed to each other via a permanent-magnet block 49. In other words, when this magnetic transcription head 37c is used, the leakage flux 26 for providing the master information carrier 22 with the applied magnetic field is not generated through excitation of the magnetic core by the coil current, but as shown by the arrow 42 in FIG. 19B, the leakage flux 26 is generated by the residual magnetization of the permanent-magnet block 49 magnetized in the magnetic path direction of the ring type magnetic core.

Thus, it is not possible to stop providing the master information carrier 22 with the applied magnetic field by switching off the coil current prior to the operation of separating the magnetic transcription head from the surface of the master information carrier as shown in FIG. 18C. Therefore, as in FIG. 15C and FIG. 16C, it is necessary to perform the operation of separating the magnetic transcription head 37c from the master information carrier 22 in a position in which the magnetic transcription head 37c faces the area between wedges 35 where the pattern of the ferromagnetic thin films 23 is not formed.

However, compared to the magnetic transcription head 37a of a permanent magnet block type shown in FIG. 13 etc., the magnetic transcription head 37c of a ring type shown in FIG. 19B etc. has a larger volume due to its configuration. Therefore, even if the magnetic transcription head 37c is in the position of facing the area between wedges 35 where the pattern of the ferromagnetic thin films 23 is not formed, it is sometimes difficult to achieve the state in which the magnetization is not completely applied to the neighboring wedge patter areas 34.

In such a case, as shown in FIG. 19A, it is also possible to use a master information carrier in which one piece or about two pieces among the plurality of wedge pattern areas 34 provided at a constant angle interval in one circle, that is, within an angle of 360 degrees of the master information carrier 22, is missing. Due to this configuration, at least in one portion within the circle of the disc, an area between wedges 35' having a sufficiently large area relative to the size of the magnetic transcription head 37c can be provided.

In other words, when the operation of separating the magnetic transcription head 37c from the master information carrier 22 is performed in the position in which the magnetic transcription head 37c faces this area between wedges 35' having a large area, it is possible to obtain excellent results without subjecting the neighboring wedge pattern areas 34 to the applied magnetic field.

In addition, the number of the wedge pattern area 34 on the master information carrier 22 generally is determined with a considerable degree of redundancy against the positioning precision of the magnetic head required for the magnetic recording reproduction device, and even in the case where one piece or about two pieces are missing in one circle of the disc, the required servo tracking performance often can be realized without any problem. Furthermore, after the vertical magnetic recording medium 21 in which the preformat recording was performed by using the master information carrier 22 shown in FIG. 19A is mounted on a magnetic recording reproduction device, the magnetized pattern corresponding to the missing wedge pattern areas can be recorded additionally with reference to other magnetized patterns in the magnetic recording medium 21 by using the magnetic head of the magnetic recording reproduction device.

FIG. 19C showed the state in which the operation of separating the magnetic transcription head 37c was performed by shifting the magnetic transcription head 37c in the direction perpendicular to the surface of the master information carrier 22 (in the direction shown by the arrow 47). However, as long as the magnetic transcription head 37c is in the position facing the area between wedges 35/35', as shown in FIG. 20C, the separating operation can be performed by shifting the magnetic transcription head 37c in the direction parallel to the surface of the master information carrier 22 (in the direction 47 shown in FIG. 20C).

Furthermore, FIG. 19B and FIG. 19C showed examples of using the master information carrier 22 in which the area between wedges 35 was formed into a concave shape adjacent the wedge pattern area 34 in order to secure exhaust paths at the time when air between the vertical magnetic recording medium 21 and the master information carrier 22 is exhausted, while FIG. 20B and FIG. 20C showed examples of using the master information carrier 22 in which the area between wedges 35 and the wedge pattern area 34 are formed flush. However, whether to perform the separating operation of the magnetic transcription head 37c in the direction perpendicular to the surface of the master information carrier 22 or in the parallel direction thereto is not dependent on whether the area between wedges 35 is formed in a concave shape or not. According to the configuration of the magnetic recording device, either combination can be selected.

The second embodiment of the present invention was described above, but the present invention is not limited to the present embodiment and can be applied to a variety of embodiments. For example, the present embodiment referred to an example of applying it to a vertical magnetic recording medium to be mounted mainly on a hard disc drive or the like. However, the present invention is not limited hereto and is applicable to other vertical magnetic recording media such as a flexible magnetic disc, a magnetic card and a magnetic tape, thereby obtaining the same effect as described above.

Furthermore, with regard to the information signals to be recorded in the vertical magnetic recording medium, preformat signals such as a servo signal for tracking, an address information signal and a reproduction clock signal were used as examples, but the information signals applicable to the present invention also are not limited to the above-mentioned signals. For example, by using the present invention, it is in principle also possible to record various data signals or audio and video signals. In this case, by employing the magnetic recording method for a vertical magnetic recording medium using the master information carrier of the present invention, the software recording medium can be mass-produced by duplication and provided inexpensively.

INDUSTRIAL APPLICABILITY

As described above, with the master information carrier used for performing a static surface recording of information signals in an in-plane magnetic recording medium, it is now possible to record a desired magnetized pattern closer to a set point by modifying the array of patterns in the ferromagnetic thin films. Accordingly, a magnetic recording medium arising no reproduction signal errors can be provided. As a result, in the preformat technology of performing a static surface recording, higher performance related to the quality of signals to be recorded in the magnetic recording medium can be further promoted.

Furthermore, when the master information carrier is used to perform a static surface recording of information signals in a vertical magnetic recording medium, more excellent recording performance can be achieved, and thus a magnetic recording medium exhibiting reproduction signals of higher quality can be provided.

The invention claimed is:

1. A method for producing a vertical magnetic recording medium, the method comprising the step of:
   bringing a surface of a master information carrier in close contact with a surface of the vertical magnetic recording medium, the surface of the master information carrier having an information signal according to a figuration pattern of an array of ferromagnetic thin films that are deposited on a surface of a substrate, and applying a magnetic field thereto, so as to record the information signal corresponding to the array of the ferromagnetic thin films as magnetization information in the vertical magnetic recording medium,
   wherein the magnetic field is applied in a direction parallel to surfaces of the ferromagnetic thin films and a surface of a magnetic layer of the vertical magnetic recording medium.

2. The method according to claim 1, further comprising the step of:
   erasing magnetization of the vertical magnetic recording medium to a neutral point at least either by applying a magnetic field alternately in opposite directions or through application of a thermomagnetization method, prior to the step of bringing the surface of the master information carrier in close contact with the surface of the vertical magnetic recording medium.

3. The method according to claim 1, further comprising the step of:
   magnetizing the vertical magnetic recording medium uniformly in a direction vertical to the surface of the magnetic layer of the vertical magnetic recording medium by applying a d.c. magnetic field to the in-plane magnetic recording medium, prior to the step of bringing the surface of the master information in close contact with the surface of the in-plain magnetic recording medium and applying the magnetic field thereto.

4. The method according to claim 1, wherein the ferromagnetic thin films have either a thickness of not more than a bit length of a digital information signal to be recorded in the vertical magnetic recording medium or a thickness of not more than a half of a shortest recording wavelength of an analog information signal to be recorded in the vertical magnetic recording medium.

5. The method according to claim 1, wherein the magnetic field is provided using a magnetic transcription head arranged in a vicinity of a back face of the master information carrier,
   the method further comprising the step of:
   shifting the magnetic transcription head relative to the master information carrier while maintaining a constant distance between the magnetic transcription head and the back face of the master information carrier in a state in which the surface of the master information carrier and the surface of the vertical magnetic recording medium are in close contact with each other, so that the magnetic field is applied over a region that requires the magnetic field, and separating the magnetic transcription head at a predetermined position farther from the master information carrier, after the step of shifting the magnetic transcription head.

6. The method according to claim 5, wherein the magnetic transcription head is an electromagnet formed by providing a magnetic core made of a ferromagnetic material with a coil winding, for the step of shifting the magnetic transcription head relative to the master information carrier while maintaining a constant distance between the magnetic transcription head and the back face of the master information carrier, a coil current is supplied to the magnetic transcription head, and prior to the step of separating the magnetic transcription head farther from the master information carrier, the supply of the coil current is stopped.

7. The method according to claim 5, wherein the master information carrier has, on its surface, an area where a figuration pattern of ferromagnetic thin films corresponding to an information signal is formed, and an area where a figuration pattern of ferromagnetic thin films is not formed, and the step of separating the magnetic transcription head farther from the master information carrier is carried out by moving the magnetic transcription head in a direction vertical to the surface of the master information carrier, at a position where the magnetic transcription head is opposed to the area where a figuration pattern of the ferromagnetic thin films is not formed.

8. The method according to claim 5, wherein the master information carrier has, on its surface, an area where a figuration pattern of ferromagnetic thin films corresponding to an information signal is formed, and an area where a figuration pattern of ferromagnetic thin film is not formed, and the step of separating the magnetic transcription head farther from the master information carrier is carried out by moving the magnetic transcription head in a direction parallel to the surface of the master information carrier, at a position where the magnetic transcription head is opposed to the area where a figuration pattern of the ferromagnetic thin films is not formed.

9. A method for producing a vertical magnetic recording medium, the method comprising the step of:

bringing a surface of a master information carrier in close contact with a surface of the vertical magnetic recording medium, the surface of the master information carrier having an information signal according to a figuration pattern of an array of ferromagnetic thin films that are deposited on a surface of a substrate, and applying a magnetic field thereto, so as to record the information signal corresponding to the array of the ferromagnetic thin films as magnetization information in the vertical magnetic recording medium, wherein the ferromagnetic thin films are magnetized in a direction parallel to the surfaces thereof, by applying the magnetic field in the direction parallel to the surfaces of the ferromagnetic thin films and a surface of a magnetic layer of the vertical magnetic recording medium, and the magnetic layer of the vertical magnetic recording medium is magnetized in a direction vertical to the surface thereof, with use of a vertical directional component of a leakage magnetic flux that leaks out between adjacent ferromagnetic thin films.

* * * * *